(12) United States Patent
Astley et al.

(10) Patent No.: US 11,481,061 B2
(45) Date of Patent: *Oct. 25, 2022

(54) PRESSURE SENSING APPARATUS AND METHOD

(71) Applicant: Cambridge Touch Technologies Ltd., Cambridge (GB)

(72) Inventors: Michael Astley, Cambridge (GB); Babak Bastani, Palo Alto, CA (US); Riccardo Micci, Cambridge (GB); Arokia Nathan, Cambridge (GB); Paul Routley, Cambridge (GB); Xiang Cheng, Cambridge (GB); Jiahao Li, Cambridge (GB)

(73) Assignee: Cambridge Touch Technologies Ltd., Cambridge (GB)

( * ) Notice: Subject to any disclaimer, the term of this patent is extended or adjusted under 35 U.S.C. 154(b) by 0 days.

This patent is subject to a terminal disclaimer.

(21) Appl. No.: 17/399,357

(22) Filed: Aug. 11, 2021

(65) Prior Publication Data

US 2021/0373698 A1 Dec. 2, 2021

Related U.S. Application Data

(63) Continuation of application No. 15/734,653, filed as application No. PCT/GB2019/051568 on Jun. 6, 2019, now abandoned.

(30) Foreign Application Priority Data

Jun. 6, 2018 (GB) ...................................... 1809320
May 21, 2019 (WO) ................ PCT/GB2019/051400

(51) Int. Cl.
*G06F 3/041* (2006.01)
*G06F 3/044* (2006.01)

(52) U.S. Cl.
CPC .......... *G06F 3/0414* (2013.01); *G06F 3/0412* (2013.01); *G06F 3/0416* (2013.01);
(Continued)

(58) Field of Classification Search
CPC .. G06F 3/0414; G06F 3/0412; G06F 3/04144; G06F 3/0416; G06F 3/04166;
(Continued)

(56) References Cited

U.S. PATENT DOCUMENTS

| | | |
|---|---|---|
| 5,543,590 A | 8/1996 | Gillespie et al. |
| 6,376,966 B1 | 4/2002 | Gallmeyer et al. |

(Continued)

FOREIGN PATENT DOCUMENTS

| | | |
|---|---|---|
| EP | 0574213 A1 | 12/1993 |
| EP | 2899615 A1 | 7/2015 |

(Continued)

OTHER PUBLICATIONS

Notice of Allowance in U.S. Appl. No. 17/263,859, Astley et al., USPTO, dated Apr. 11, 2022, 9 pages.

(Continued)

*Primary Examiner* — Temesghen Ghebretinsae
*Assistant Examiner* — Ivelisse Martinez Quiles

(57) ABSTRACT

An apparatus (73) for processing signals from a touch panel (10) is described. The touch panel (10) includes a layer of piezoelectric material (16) disposed between a number of sensing electrodes (14, 20) and at least one common electrode (15). The apparatus (73) includes a capacitive touch controller (69) for connection to the sensing electrodes (14, 20). The apparatus (73) also includes a switch network (74) including a number of inputs for connection to some or all of the sensing electrodes (14, 20), and an output connected to system ground or a common mode voltage ($V_{CM}$). The apparatus (73) also includes a second circuit (24, 44) for (Continued)

connection to the at least one common electrode (15) and configured to generate, based on signals received from the at least one common electrode, a second pressure signal (30) indicative of a total pressure applied to the touch panel (10). The apparatus (73) also includes a controller (25) configured to control the switch network (74) to couple any connected sensing electrodes (14, 20) to system ground or the common mode voltage ($V_{CM}$) during a pressure measurement period, and to determine an estimate of the total pressure based on the second pressure signal during the pressure measurement period.

20 Claims, 20 Drawing Sheets

(52) U.S. Cl.
CPC .......... *G06F 3/0418* (2013.01); *G06F 3/0443* (2019.05); *G06F 3/0445* (2019.05); *G06F 3/0446* (2019.05); *G06F 3/04144* (2019.05); *G06F 3/04166* (2019.05); *G06F 3/04186* (2019.05); *G06F 2203/04104* (2013.01); *G06F 2203/04105* (2013.01); *G06F 2203/04106* (2013.01); *G06F 2203/04107* (2013.01)

(58) Field of Classification Search
CPC .. G06F 3/0418; G06F 3/04186; G06F 3/0443; G06F 3/0445; G06F 3/0446; G06F 2203/04104; G06F 2203/04105; G06F 2203/04106; G06F 2203/04107; G06F 3/04182; G06F 2203/04103; G06F 3/041–0446
See application file for complete search history.

(56) References Cited

U.S. PATENT DOCUMENTS

| | | | |
|---|---|---|---|
| 9,417,725 | B1 | 8/2016 | Watazu et al. |
| 9,690,408 | B1 | 6/2017 | Krah |
| 9,983,715 | B2 | 5/2018 | Filiz et al. |
| 10,013,094 | B1 | 7/2018 | Smith |
| 10,120,478 | B2 | 11/2018 | Filiz et al. |
| 10,126,807 | B2 | 11/2018 | Nathan et al. |
| 10,254,894 | B2 | 4/2019 | Nathan et al. |
| 10,282,046 | B2 | 5/2019 | Nathan et al. |
| 10,310,659 | B2 | 6/2019 | Nathan et al. |
| 10,318,038 | B2 | 6/2019 | Nathan et al. |
| 10,430,009 | B2 | 10/2019 | Nathan et al. |
| 10,496,210 | B2 | 12/2019 | Nathan et al. |
| 10,739,926 | B2 | 8/2020 | Nathan et al. |
| 10,817,116 | B2 | 10/2020 | Bagheri et al. |
| 10,852,875 | B2 | 12/2020 | Routley et al. |
| 10,928,947 | B2 | 2/2021 | Micci et al. |
| 10,928,950 | B2 | 2/2021 | Nathan et al. |
| 11,093,088 | B2 | 8/2021 | Bagheri et al. |
| 11,221,703 | B2 | 1/2022 | Routley et al. |
| 11,231,801 | B2 | 1/2022 | Routley et al. |
| 11,353,980 | B2 | 6/2022 | Astley et al. |
| 2007/0262962 | A1 | 11/2007 | XiaoPing et al. |
| 2009/0146970 | A1 | 6/2009 | Lowles et al. |
| 2009/0309616 | A1 | 12/2009 | Klinghult et al. |
| 2010/0079384 | A1 | 4/2010 | Grivna et al. |
| 2010/0085322 | A1 | 4/2010 | Mamba et al. |
| 2010/0110026 | A1 | 5/2010 | Kis et al. |
| 2011/0102061 | A1 | 5/2011 | Wang et al. |
| 2011/0147101 | A1 | 6/2011 | Bateman et al. |
| 2012/0057803 | A1 | 3/2012 | Wakazono |
| 2012/0120017 | A1 | 5/2012 | Worfolk et al. |
| 2012/0268416 | A1 | 10/2012 | Pirogov et al. |
| 2012/0299868 | A1 | 11/2012 | Bhagavat et al. |
| 2013/0033451 | A1 | 2/2013 | Olsen |
| 2013/0076646 | A1 | 3/2013 | Krah et al. |
| 2013/0113715 | A1 | 5/2013 | Grant et al. |
| 2013/0176274 | A1 | 7/2013 | Sobel et al. |
| 2013/0265256 | A1 | 10/2013 | Nathan et al. |
| 2014/0008203 | A1 | 1/2014 | Nathan et al. |
| 2014/0043289 | A1 | 2/2014 | Stern |
| 2014/0049892 | A1 | 2/2014 | Huang et al. |
| 2014/0139444 | A1 | 5/2014 | Kauhanen et al. |
| 2014/0292699 | A1 | 10/2014 | Ando |
| 2014/0362304 | A1 | 12/2014 | Wang et al. |
| 2015/0077402 | A1 | 3/2015 | Ye et al. |
| 2015/0103042 | A1 | 4/2015 | Lee et al. |
| 2015/0153900 | A1 | 6/2015 | Chang et al. |
| 2015/0168466 | A1 | 6/2015 | Park et al. |
| 2015/0331517 | A1 | 6/2015 | Filiz et al. |
| 2015/0355771 | A1 | 12/2015 | Watazu et al. |
| 2016/0098131 | A1 | 4/2016 | Ogata et al. |
| 2016/0117034 | A1 | 4/2016 | Day et al. |
| 2016/0124544 | A1 | 5/2016 | Kang et al. |
| 2016/0179276 | A1 | 6/2016 | Nathan et al. |
| 2016/0259465 | A1 | 9/2016 | Agarwal et al. |
| 2016/0282999 | A1 | 9/2016 | Hwang et al. |
| 2016/0306481 | A1* | 10/2016 | Filiz .................. G06F 3/0445 |
| 2016/0355331 | A1 | 12/2016 | Kano et al. |
| 2017/0199624 | A1 | 7/2017 | Nathan et al. |
| 2017/0228072 | A1 | 8/2017 | Amin et al. |
| 2017/0235410 | A1 | 8/2017 | Costa et al. |
| 2017/0242507 | A1 | 8/2017 | Chang et al. |
| 2017/0262099 | A1 | 9/2017 | Nathan et al. |
| 2017/0308237 | A1 | 10/2017 | Sun et al. |
| 2017/0371470 | A1 | 12/2017 | Nathan et al. |
| 2018/0045586 | A1 | 2/2018 | Kawamura |
| 2018/0046359 | A1 | 2/2018 | Kim et al. |
| 2018/0081466 | A1 | 3/2018 | Moon |
| 2018/0088718 | A1 | 3/2018 | Liu et al. |
| 2018/0095574 | A1 | 4/2018 | Kim et al. |
| 2018/0097041 | A1 | 4/2018 | Ito |
| 2018/0143728 | A1 | 5/2018 | Withers et al. |
| 2018/0183438 | A1 | 6/2018 | Shigetaka et al. |
| 2018/0260065 | A1 | 9/2018 | Huang et al. |
| 2018/0307365 | A1 | 10/2018 | Chen et al. |
| 2019/0034021 | A1 | 1/2019 | Zhao et al. |
| 2019/0114001 | A1 | 4/2019 | Mugiraneza et al. |
| 2019/0129557 | A1 | 5/2019 | Liu et al. |
| 2019/0253053 | A1 | 8/2019 | Nathan et al. |
| 2019/0286263 | A1 | 9/2019 | Bagheri et al. |
| 2019/0361559 | A1 | 11/2019 | Guo et al. |
| 2019/0377452 | A1 | 12/2019 | Routley et al. |
| 2019/0377468 | A1 | 12/2019 | Micci et al. |
| 2019/0377469 | A1 | 12/2019 | Routley et al. |
| 2019/0384441 | A1 | 12/2019 | Seo et al. |
| 2019/0384479 | A1 | 12/2019 | Togashi |
| 2020/0159381 | A1 | 5/2020 | Ban et al. |
| 2020/0293132 | A1 | 9/2020 | Nathan et al. |
| 2020/0356207 | A1 | 11/2020 | Routley et al. |
| 2021/0141507 | A1 | 5/2021 | Micci et al. |
| 2021/0165550 | A1 | 6/2021 | Astley et al. |
| 2021/0232257 | A1 | 7/2021 | Routley et al. |
| 2021/0263633 | A1 | 8/2021 | Astley et al. |

FOREIGN PATENT DOCUMENTS

| | | |
|---|---|---|
| EP | 2902886 A1 | 8/2015 |
| GB | 2138567 A | 10/1984 |
| GB | 2544353 A1 | 5/2017 |
| JP | 2013-131110 A | 7/2013 |
| JP | 2015097068 A | 5/2015 |
| WO | 2006135483 A2 | 12/2006 |
| WO | 2009150498 A2 | 12/2009 |
| WO | 2012031564 A1 | 3/2012 |
| WO | 2014045847 A1 | 3/2014 |
| WO | 2014098946 A1 | 6/2014 |
| WO | 2014129083 A1 | 8/2014 |
| WO | 2014192786 A1 | 12/2014 |
| WO | 2015046289 A1 | 4/2015 |
| WO | 2015098725 A1 | 7/2015 |
| WO | 2016102975 A2 | 6/2016 |
| WO | 2016199626 A1 | 12/2016 |

(56) References Cited

FOREIGN PATENT DOCUMENTS

| WO | 2017109455 A1 | 6/2017 |
|---|---|---|
| WO | 2017122466 A1 | 7/2017 |
| WO | 2019030513 A1 | 2/2019 |

OTHER PUBLICATIONS

Notice of Allowance in U.S. Appl. No. 16/430,549, USPTO, dated Jun. 26, 2020, 8 pages.
Notice of Allowance in U.S. Appl. No. 16/430,549, USPTO, dated Apr. 9, 2020, 8 pages.
Extended European Search Report in EPO application EP 19177653.3, dated Oct. 30, 2019, 9 pages.
Combined Search and Examination Report under Sections 17 and 18(3) for UK application No. GB1815617.4 dated Mar. 14, 2019, 7 pages.
Extended European Search Report in EPO application 19177643.4, dated Oct. 30, 2019, 10 pages.
Combined Search and Examination Report under Sections 17 and 18(3) for UK application No. GB1809318.7 dated Dec. 21, 2018, 5 pages.
Notice of Allowance in U.S. Appl. No. 16/431,488, dated Oct. 7, 2020, 9 pages.
Non-final Office Action, U.S. Appl. No. 17/263,859, Astley, et. al., USPTO, dated Jul. 6, 2021, 19 pages.
Non-final Office Action, U.S. Appl. No. 16/939,252, Routley, et. al., USPTO, dated May 13, 2021, 17 pages.
Non-final Office Action, U.S. Appl. No. 16/636,668, Bagheri, et. al., USPTO, dated Apr. 30, 2021, 37 pages.
Notice of Allowance in U.S. Appl. No. 15/734,600, Routley et. al., USPTO, dated Sep. 2, 2021, 9 pages.
Notice of Allowance in U.S. Appl. No. 16/939,252, Routley, et. al., USPTO, dated Aug. 31, 2021, 5 pages.
Non-final Office Action, U.S. Appl. No. 15/734,600, Routley, et. al., USPTO, dated May 14, 2021, 36 pages.
Astley et. al., USPTO, Amendment/response filed with RCE in U.S. Appl. No. 17/263,859, dated Mar. 7, 2022, 9 pages.
Combined Search and Examination Report under Sections 17 and 18(3) for UK application No. GB1809320.3 dated Dec. 21, 2018, 5 pages.
International Search Report and Written Opinion, dated Jul. 23, 2019, directed to International application No. PCT/GB2019/051568, 14 pages.
International Search Report and Written Opinion, dated Jul. 23, 2019, directed to International application No. PCT/GB2019/051400, 13 pages.
International Search Report and Written Opinion, dated Jul. 23, 2019, directed to International application no. PCT/GB2019/051567, 13 pages.
International Search Report and Written Opinion, dated Sep. 5, 2019, directed to International application No. PCT/GB2019/051605, 12 pages.
Notice of Allowance in U.S. Appl. No. 16/430,549 USPTO, dated Aug. 21, 2020, 8 page.
Notice of Allowance in U.S. Appl. No. 16/430,044, USPTO, dated Mar. 30, 2020, 8 pages.
Routley, U.S. Appl. No. 16/939,252, filed Jul. 27, 2020, 50 pages.
International Search Report and Written Opinion, dated Mar. 6, 2020, directed to International application No. PCT/GB2019/053434, 15 pages.
Notice of Allowance in U.S. Appl. No. 17/263,859, USPTO, dated Dec. 7, 2021, 8 pages.
Examination Report under Sections 12 and 13 of the Patent Act, 1970 and the Patents Rules, 2003 for Indian patent application No. 202017050821, The Patent Office, Intellectual Property India, dated Jul. 27, 2022, 7 pages.
Examination Report under Sections 12 and 13 of the Patent Act, 1970 and the Patents Rules, 2003 for Indian patent application No. 202017050822, The Patent Office, Intellectual Property India, dated Jul. 27, 2022, 6 pages.

* cited by examiner

PRESSURE SENSING APPARATUS AND METHOD

CROSS REFERENCE TO RELATED APPLICATIONS

This application is a continuation of U.S. patent application Ser. No 15/734,653, filed Dec. 3, 2020, which application is a 35 U.S.C. § 371 application of PCT/GB2019/051568, which was filed on Jun. 6, 2019, and claims the benefit of priority from United Kingdom Application 1809320.3, filed Jun. 6, 2018, and United Kingdom Application No. PCT/GB2019/051400, filed May 212019, all of which are incorporated by reference as if fully disclosed herein

FIELD OF THE INVENTION

The present invention relates to apparatus and methods for processing signals from a pressure-sensing touch panel, and to touch panel systems using the apparatus and method.

BACKGROUND

Resistive and capacitive touch panels are used as input devices for computers and mobile devices. One type of capacitive touch panel, projected capacitance touch panels, is often used for mobile devices. An example of a projected capacitance touch panel is described in US 2010/0079384 A1.

Projected capacitance touch panels operate by detecting changes in electric fields caused by the proximity of a conductive object. The location at which a projected capacitance touch panel is touched is often determined using an array or grid of capacitive sensors. Although projected capacitance touch panels can usually differentiate between single-touch events and multi-touch events, they suffer the drawback of not being able to sense pressure. Thus, projected capacitance touch panels tend to be unable to distinguish between a relatively light tap and a relatively heavy press. A touch panel which can sense pressure can allow a user to interact with a device in new ways by providing additional information about user interaction(s) with the touch panel.

WO 2016/102975 A2 describes apparatus and methods for combined capacitance and pressure sensing in which a single signal is amplified then subsequently separated into pressure and capacitance components. WO 2017/109455 A1 describes apparatus and methods for combined capacitance and pressure sensing in which a single signal is separated into a capacitance signal, and a pressure signal which is amplified.

SUMMARY

According to a first aspect of the invention, there is provided apparatus for processing signals from a touch panel. The touch panel includes a layer of piezoelectric material disposed between a plurality of sensing electrodes and at least one common electrode. The apparatus includes a first circuit for connection to the plurality of sensing electrodes. The first circuit is configured to generate a plurality of first pressure signals. Each first pressure signal corresponds to one or more sensing electrodes and is indicative of a pressure acting on the touch panel proximate to the corresponding one or more sensing electrodes. The apparatus also includes a second circuit for connection to the at least one common electrode. The second circuit is configured to generate a second pressure signal indicative of a total pressure applied to the touch panel. The apparatus also includes a controller configured to determine an estimate of the total pressure based on a weighted difference of the second pressure signal and a sum over the plurality of first pressure signals.

Each sensing electrode may contribute to a single first pressure signal.

The controller may be further configured to determine a location at which pressure is applied to the touch panel. A coefficient used for the weighted difference of the second pressure signal and the sum over the plurality of first pressure signals may depend upon the location.

The controller may determine the estimate of the total pressure using the equation:

$$F_{CE} = (1 - C_{CE})Q_{CE} - C_{CE}Q_{sen}$$

in which $F_{CE}$ is a piezoelectric charge induced on the at least one common electrode, $Q_{CE}$ is a charge measured on the at least one common electrode, $Q_{sen}$ is the sum of charges measured on all of the plurality of sensing electrodes, and $C_{CE}$ is a pre-calibrated constant having a value between zero and unity. The estimate of the total pressure may be based on $F_{CE}$.

The controller may be further configured to determine, for each of at least one first pressure signal, an estimate of the pressure acting on the touch panel proximate to the corresponding one or more sensing electrodes, based on the first pressure signal, the second pressure signal and the total pressure.

The controller may be configured to determine a location at which pressure is applied to the touch panel. One or more coefficients used to determine the estimate of the pressure acting on the touch panel proximate to the one or more sensing electrodes may depend upon the location.

The touch panel may include a number N of sensing electrodes, and the controller may determine the estimate of the pressure acting on the touch panel proximate to the one or more sensing electrodes using the equation:

$$F_n = Q_n - \frac{k_n}{C_{CE}}(Q_{CE} - F_{CE})$$

in which $F_n$ is a piezoelectric charge induced on the $n^{th}$ of N sensing electrodes, $F_{CE}$ is a piezoelectric charge induced on the at least one common electrode, $Q_n$ is a charge measured on the $n^{th}$ of N sensing electrodes, $Q_{CE}$ is a charge measured on the at least one common electrode, $C_{CE}$ is a pre-calibrated constant having a value between zero and unity, and $k_n$ is a pre-calibrated constant corresponding to the $n^{th}$ of N sensing electrodes and having a value between zero and unity. The estimate of the pressure acting on the touch panel proximate to the one or more sensing electrodes may be based on one or more corresponding values of $F_n$.

The first circuit may also be configured to generate, for each first electrode, a capacitance signal indicative of a capacitance of the sensing electrode. The controller may be configured to determine a location at which pressure is applied to the touch panel based on the capacitance signals.

Generating the first pressure signals and the capacitance signals may include separating single signals received from the sensing electrodes.

Each first pressure signal may correspond to a single sensing electrode.

A touch panel system may include the apparatus, and a touch panel including a layer of piezoelectric material disposed between a plurality of sensing electrodes and at least one common electrode.

An electronic device may include the touch panel system.

According to a second aspect of the invention, there is provided a method of processing signals from a touch panel. The touch panel includes a layer of piezoelectric material disposed between a plurality of sensing electrodes and at least one common electrode. The method includes generating a plurality of first pressure signals. Each first pressure signal is based on signals received from one or more sensing electrodes. Each first pressure signal is indicative of a pressure acting on the touch panel proximate to the corresponding one or more sensing electrodes. The method also includes generating, based on signals received from the at least one common electrode, a second pressure signal indicative of a total pressure applied to the touch panel. The method also includes determining an estimate of the total pressure based on a weighted difference of the second pressure signal and a sum over the plurality of first pressure signals.

The method may also include determining a location at which pressure is applied to the touch panel. A coefficient used for the weighted difference of the second pressure signal and the sum over the plurality of first pressure signals may depend upon the location.

Determining the estimate of the total pressure applied to the touch panel may include using the equation:

$$F_{CE} = (1 - C_{CE})Q_{CE} - C_{CE}Q_{sen}$$

in which $F_{CE}$ is a piezoelectric charge induced on the at least one common electrode, $Q_{CE}$ is a charge measured on the at least one common electrode, $Q_{sen}$ is the sum of charges measured on all of the plurality of sensing electrodes and $C_{CE}$ is a pre-calibrated constant having a value between zero and unity. The estimate of the total pressure may be based on $F_{CE}$.

The method may also include determining, for each of at least one first pressure signal, an estimate of the pressure acting on the touch panel proximate to the corresponding one or more sensing electrodes, based on the first pressure signal, the second pressure signal and the total pressure.

The method may also include determining a location at which pressure is applied to the touch panel. One or more coefficients used to determine the estimate of the pressure acting on the touch panel proximate to the one or more sensing electrodes may depend upon the location.

The touch panel may include a number N of sensing electrodes. Determining the estimate of the pressure acting on the touch panel proximate to the one or more sensing electrodes may include using the equation:

$$F_n = Q_n - \frac{k_n}{C_{CE}}(Q_{CE} - F_{CE})$$

in which $F_n$ is a piezoelectric charge induced on the $n^{th}$ of N sensing electrodes, $F_{CE}$ is a piezoelectric charge induced on the at least one common electrode, $Q_n$ is a charge measured on the $n^{th}$ of N sensing electrodes, $Q_{CE}$ is a charge measured on the at least one common electrode, $C_{CE}$ is a pre-calibrated constant having a value between zero and unity, and $k_n$ is a pre-calibrated constant corresponding to the $n^{th}$ of N sensing electrodes and having a value between zero and unity. The estimate of the pressure acting on the touch panel proximate to the one or more sensing electrodes may be based on one or more corresponding values of $F_n$.

The method may also include generating, based on signals received from each sensing electrode, a capacitance signal indicative of a capacitance of the sensing electrode. The method may also include determining a location at which pressure is applied to the touch panel based on the capacitance signals.

Generating the first pressure signals and the capacitance signals may include separating single signals received from the sensing electrodes.

Each first pressure signal may correspond to a single sensing electrode.

According to a third aspect of the invention, there is provided apparatus for processing signals from a touch panel. The touch panel includes a layer of piezoelectric material disposed between a number of sensing electrodes and at least one common electrode. The apparatus includes a capacitive touch controller for connection to the sensing electrodes. The apparatus also includes a switch network including a number of inputs for connection to some or all of the sensing electrodes, and an output connected to system ground or a common mode voltage. The apparatus also includes a second circuit for connection to the at least one common electrode and configured to generate, based on signals received from the at least one common electrode, a second pressure signal indicative of a total pressure applied to the touch panel. The apparatus also includes a controller configured to control the switch network to couple any connected sensing electrodes to system ground or the common mode voltage during a pressure measurement period, and to determine an estimate of the total pressure based on the second pressure signal during the pressure measurement period.

The second circuit may be an internal charge amplifier of the capacitive touch controller.

The apparatus may include a third switch network configured to connect the internal charge amplifier to a sensing electrode during a capacitance measurement period, and to connect the internal charge amplifier to the at least one common electrode during the pressure measurement period.

The third switch network may be further configured to connect the at least one common electrode to system ground or the common mode voltage during the capacitance measurement period, and to connect the sensing electrode to system ground or the common mode voltage during the pressure measurement period.

The apparatus may also include a common electrode switch configured to connect the at least one common electrode to system ground or the common mode voltage during a capacitance measurement period, and xxx to connect the at least one common electrode to the second circuit during the pressure measurement period.

The switch network may be configured for connection to a subset of the sensing electrodes. The apparatus may also include a first circuit for connection to the sensing electrodes not included in the subset, the first circuit configured to generate a first pressure signal indicative of a pressure acting on the touch panel proximate to the connected sensing electrodes. The controller may be configured to determine the estimate of the total pressure based on a weighted difference of the second pressure signal and the first pressure signal.

The capacitive touch controller may be configured for connection to each sensing electrode via a corresponding first switch. Each input of the switch network may be connected to system ground or the common mode voltage by a corresponding second switch. The second circuit may include a common electrode charge amplifier configured to generate the second pressure signal. The controller may be configured to control the first and second switches to close the first switches and open the second switches during a capacitance measurement period, and to open the first switches and close the second switches during the pressure measurement period.

The common electrode charge amplifier may include an operational amplifier having a feedback network connected in parallel with a third switch. The controller may be further configured to control the third switch to close during one or more reset periods during the pressure measurement period.

The capacitive touch controller may be configured to generate, for each sensing electrode, a capacitance signal indicative of a capacitance of the sensing electrode. The controller or the capacitive touch controller may be configured to determine a location at which pressure is applied to the touch panel based on the capacitance signals.

A touch panel system may include the apparatus and a touch panel including a layer of piezoelectric material disposed between a number of sensing electrodes and at least one common electrode.

An electronic device may include the touch panel system.

According to a fourth aspect of the invention, there is provided a method of processing signals from a touch panel. The touch panel includes a layer of piezoelectric material disposed between a number of sensing electrodes and at least one common electrode. The sensing electrodes are connected to a capacitive touch controller. The at least one common electrode is connected to a second circuit. The method includes coupling, using a switch network, some or all of the sensing electrodes to system ground or a common mode voltage during a pressure measurement period. The method also includes generating, using the second circuit, a second pressure signal indicative of a total pressure applied to the touch panel, the second pressure signal based on signals received from the at least one common electrode. The method also includes determining, using a controller, an estimate of the total pressure based on the second pressure signal during the pressure measurement period.

The second circuit may be an internal charge amplifier of the capacitive touch controller.

The method may also include connecting, using a third switch network, the internal charge amplifier to a sensing electrode during a capacitance measurement period. The method may also include connecting, using the third switch network, the internal charge amplifier to the at least one common electrode during the pressure measurement period.

The method may also include connecting, using the third switch network, the at least one common electrode to system ground or the common mode voltage during the capacitance measurement period. The method may also include connecting, using the third switch network, the sensing electrode to system ground or the common mode voltage during the pressure measurement period.

The method may also include connecting, using a common electrode switch, the at least one common electrode to system ground or the common mode voltage during a capacitance measurement period. The method may also include connecting, using the common electrode switch, the at least one common electrode to the second circuit during the pressure measurement period.

The switch network may be connected to a subset of the sensing electrodes. The method may also include generating, using a first circuit connected to the sensing electrodes not included in the subset, a first pressure signal indicative of a pressure acting on the touch panel proximate to the connected sensing electrodes. Determining the estimate of the total pressure may include determining the estimate of the total pressure based on a weighted difference of the second pressure signal and the first pressure signal.

Each sensing electrode may be connected to the capacitive touch controller by a corresponding first switch. The switch network may include a number of second switches, each second switch connecting a sensing electrode to system ground or the common mode voltage. The second circuit may include a common electrode charge amplifier configured to generate the second pressure signal. The method may also include using the controller to control the first and second switches to close the first switches and open the second switches during a capacitance measurement period and to open the first switches and close the second switches during the pressure measurement period.

The common electrode charge amplifier may include an operational amplifier having a feedback network connected in parallel with a third switch. The method may also include using the controller to control the third switch to close during one or more reset periods during the pressure measurement period.

The method may also include generating for each sensing electrode, using the capacitive touch controller, a capacitance signal indicative of a capacitance of the sensing electrode. The method may also include determining, using the controller or the capacitive touch controller, a location at which pressure is applied to the touch panel based on the capacitance signals.

BRIEF DESCRIPTION OF THE DRAWINGS:

Certain embodiments of the present invention will now be described, by way of example, with reference to the accompanying drawings in which.

Figure 1:
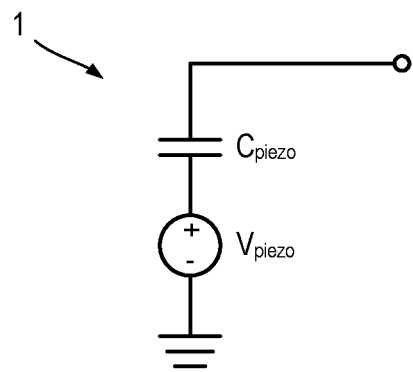
FIG. 1 is an equivalent circuit diagram of a piezoelectric sensor.

DETAILED DESCRIPTION:

In the following description, like parts are denoted by like reference numerals.

In some circumstances, a variety of unwanted signals may couple via a user's digit or conductive stylus to the sensing electrodes of a piezoelectric pressure sensing touch panel or a combined capacitance and piezoelectric pressure sensing touch panel. Such signals may be amplified along with the desired piezoelectric pressure signals, and may be of comparable or larger amplitude than piezoelectric pressure signals. For example a user's digit placed on a piezoelectric pressure sensing touch panel or a combined capacitance and piezoelectric pressure sensing touch panel sensor may couple mains interference into the sensing electrodes. Additionally or alternatively, a user may become charged with static electricity, which may couple to the sensing electrodes of a piezoelectric pressure sensing touch panel or a combined capacitance and piezoelectric pressure sensing touch panel.

Piezoelectric sensors are two electrode devices with a typically high output impedance at low frequencies, which may cause piezoelectric sensors to become vulnerable to picking up interference from external electric fields. The desired signals generated on the two electrodes of a piezoelectric sensor due to mechanical strain are of opposite polarity. By contrast, interference due to coupling to external electric fields will be of the same polarity on both electrodes. The present specification describes methods and apparatus for combining the signals from electrodes arranged on opposite sides of a layer of piezoelectric material, so that interference from coupling to external electric fields may be reduced or removed, whilst retaining or enhancing the desired piezoelectric pressure signals.

Piezoelectric Sensing

Referring to FIG. 1, an equivalent circuit of a piezoelectric sensor 1 is shown.

A piezoelectric sensor 1 may be modelled as a voltage source, $V_{piezo}$, in series with a capacitor, $C_{piezo}$. The capacitance $C_{piezo}$ represents the capacitance between first and second electrodes which are arranged with piezoelectric material between them. The voltage source $V_{piezo}$ represents an open circuit voltage generated across the capacitance $C_{piezo}$ when a force is applied to the piezoelectric sensor 1.

Figure 2:
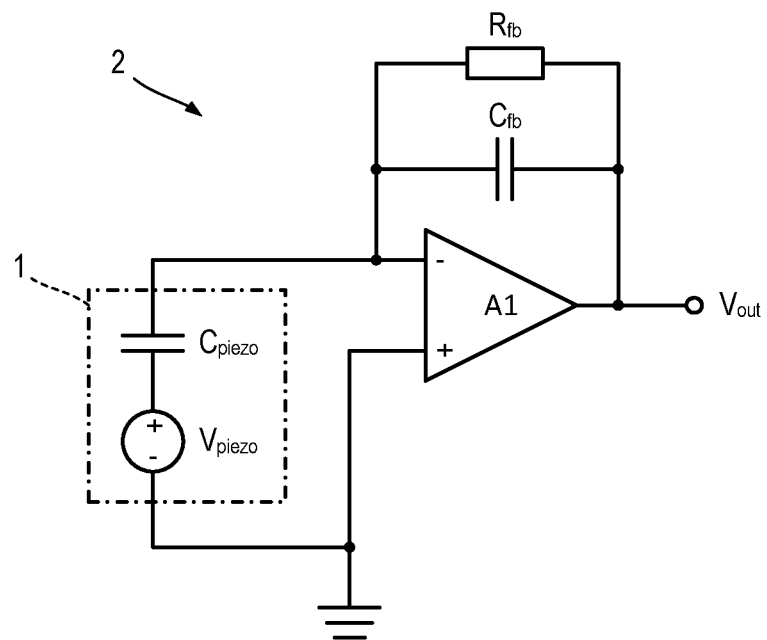
FIG. 2 is a circuit diagram of a first measurement circuit.

Referring also to FIG. 2, a first example of a measurement circuit 2 is shown.

The first measurement circuit 2 includes a single-ended amplifier A1 having inputs connected across the piezoelectric sensor 1 and a feedback network in the form of a resistor $R_{fb}$ and capacitor $C_{fb}$, connected in parallel across the output and the inverting input of the amplifier A1. In practice, the first measurement circuit 2 may include further passive components, switches for resetting the feedback network, and so forth. Depending upon the specific configuration used, the first measurement circuit 2 may measure a voltage, a current, a charge or a combination thereof.

Figure 3:
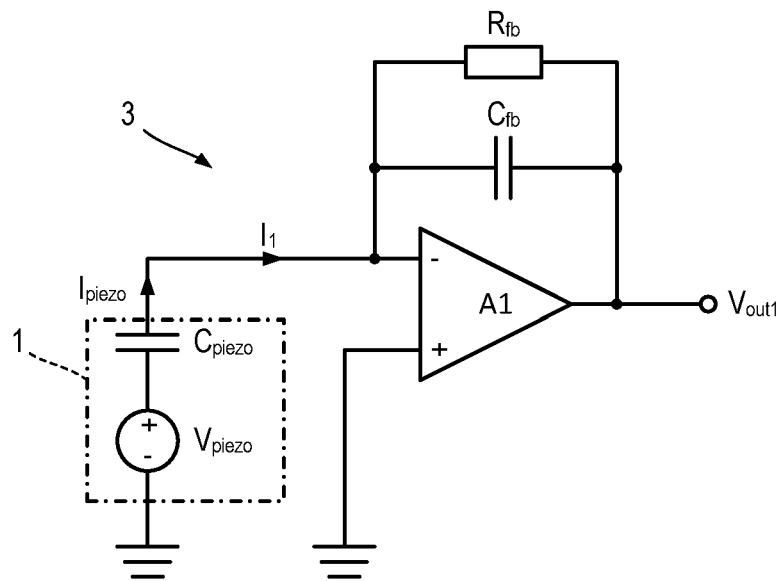
FIG. 3 is a circuit diagram of a second measurement circuit.

Referring also to FIG. 3, a second example of a measurement circuit 3 is shown.

The second measurement circuit 3 is the same as the first measurement circuit 2, except that the non-inverting input of the single-ended amplifier A1 is grounded, rather than connected to an electrode of the piezoelectric sensor 1. In this way, the second measurement circuit 3 measures the current 1, flowing into the inverting input which is at ground potential. This configuration of the second measurement circuit may reduce or eliminate the effect of parasitic capacitances. In ideal circumstances, the measured current $I_1$ is substantially equal to an induced piezoelectric current signal $I_{piezo}$, i.e. $I_1 \approx I_{piezo}$. Typically, the second measurement circuit 3 is configured to integrate the current signal $I_1$ in order to provide on the output $V_{out1}$ a charge signal corresponding to a charge $Q_{piezo}$ induced across the piezoelectric sensor 1. In other words, $V_{out1}$ is functionally related to the piezoelectric charge $Q_{piezo}$, which in turn is functionally related to a force applied to the piezoelectric sensor 1.

Figure 4:
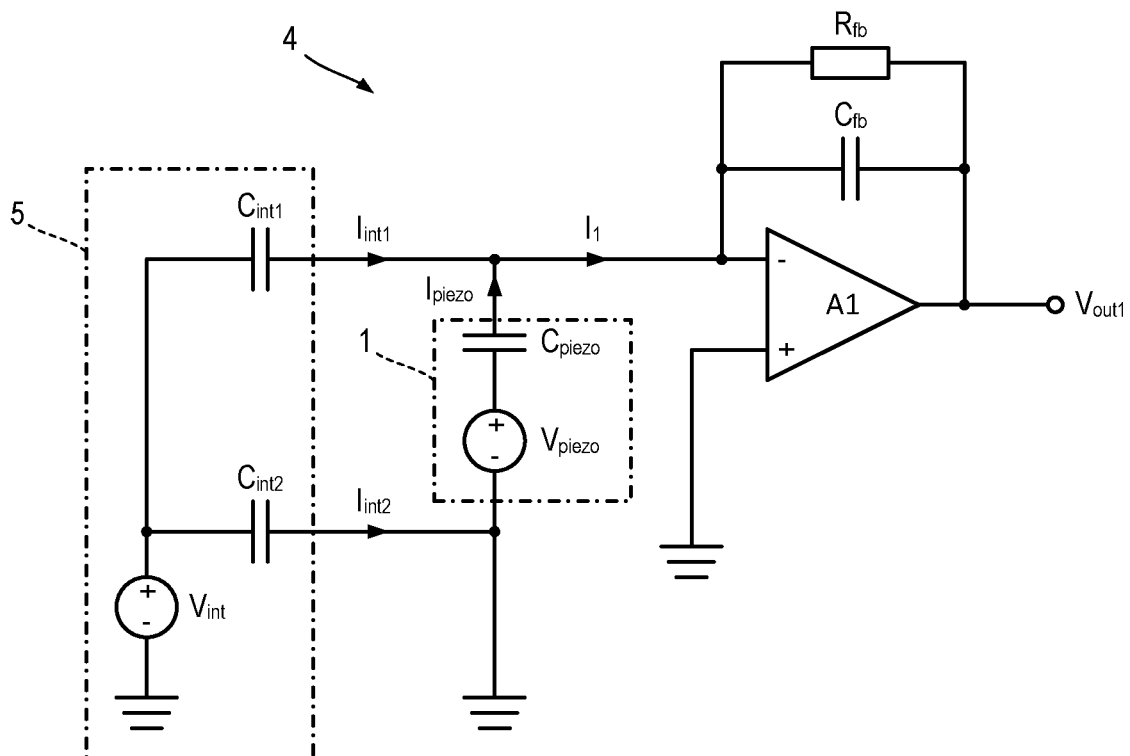
FIG. 4 is a circuit diagram of a third measurement circuit.

Referring also to FIG. 4, a third example of a measurement circuit 4 is shown.

The third measurement circuit 4 is the same as the second measurement circuit 3, except that it includes an equivalent circuit 5 representing capacitive coupling to an external source of electromagnetic interference, $V_{int}$.

A potential issue with single-ended amplifiers A1 is that external electric fields may induce a charge on the amplifier input that may be interpreted as a piezoelectric pressure signal. This problem may occur in the piezoelectric force sensors of touch screens for piezoelectric pressure sensing or touch screens for combined capacitive touch and piezoelectric pressure sensing. A users' digit or conductive stylus applying the force to be measured is typically separated from the electrodes forming a piezoelectric force sensor by one or several thin layers of glass and/or plastic. A users' digit or conductive stylus may be at a different potential to the electrodes forming a piezoelectric force sensor. Such potential differences may arise due to, for example, electrostatic charging or coupling to other electrical sources, for example, pick-up induced by a mains power supply.

In the third measurement circuit 4, an interfering electromagnetic source $V_{int}$ couples to both electrodes of the piezoelectric sensor 1 via a pair of capacitances $C_{int1}$ and $C_{int2}$. Consequently, the measured signal $I_1$ is a superposition of the desired piezoelectric pressure signal $I_{piezo}$ and an unwanted interference signal $I_{int1}$, i.e. $I_1 = I_{piezo} + I_{int1}$. The inclusion of the interference signal component $I_{int1}$ in the measured signal $I_1$ may cause errors in determining an applied force, for example false detection of an applied force and/or causing the smallest reliably measureable increment of applied force to be increased.

Differential Measurements

The current flow induced in response to polarisation $\underline{P}$ of piezoelectric material between a pair of first and second electrodes forming a piezoelectric sensor 1 has the opposite sense in each of the first and second electrodes. By contrast, interference signals induced by external sources $V_{int}$ will have the same sign for the first and second electrodes forming a piezoelectric sensor 1.

Figure 5:
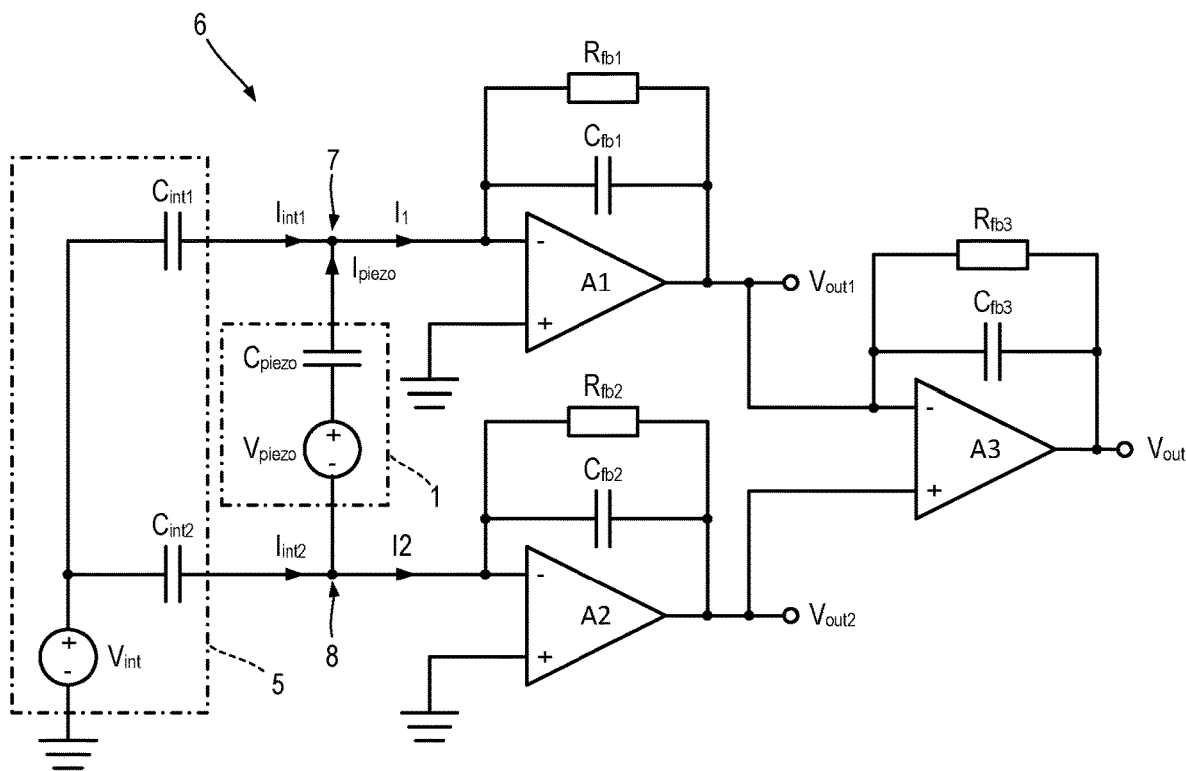
FIG. 5 is a circuit diagram of a fourth measurement circuit.

Referring also to FIG. 5, a fourth example of a measurement circuit 6 is shown.

In the fourth measurement circuit 6, a first single-ended amplifier A1 has one input connected to a first electrode 7 of the piezoelectric sensor 1 to receive a first measurement current $I_1$, and the other input of the first amplifier A1 is grounded. Similarly, a second single-ended amplifier A2 has one input connected to a second electrode 8 of the piezoelectric sensor 1 to receive a second measurement current $I_2$, and the other input of the second amplifier A2 is grounded. A third single-ended amplifier A3 has one input connected to the output $V_{out1}$ of the first amplifier A1 and the other input connected to the output $V_{out2}$ of the second amplifier A2. Each of the amplifiers A1, A2, A3 has a respective resistive-capacitive feedback network $R_{fb1}$-$C_{fb1}$, $R_{fb2}$-$C_{fb2}$, $R_{fb3}$-$C_{fb3}$.

The interfering source $V_{int}$ is capacitively coupled to the first electrode 7 by a first capacitance $C_{int1}$ and to the second electrode 8 by a second capacitance $C_{int2}$. As discussed hereinbefore, the current flow $I_{piezo}$ induced in response to polarisation $\underline{P}$ of piezoelectric material between the first and second electrode 7, 8 has the opposite sense in each of terminals 7, 8, whereas interference signals $I_{int1}$, $I_{int2}$ induced by the interfering source $V_{int}$ will have the same sign. Accordingly, the first and second measurement currents may be approximated as:

$$I_1 = I_{int1} + I_{piezo}$$

$$I_2 = I_{int2} - I_{piezo} \quad (1)$$

The third amplifier A3 is used to obtain a difference, and when $I_{int1} \approx I_{int2}$, the output $V_{out}$ of the third amplifier A3 will be related to:

$$I_1 - I_2 \approx 2 I_{piezo} \quad (2)$$

In this way, by measuring the current flowing from both electrodes 7, 8 of the piezoelectric sensor 1 it is possible to determine a measure of the piezoelectric current $I_{piezo}$ in which the influence of the interfering source $V_{int}$ is reduced or removed.

In the general case, if $C_{int1} \neq C_{int2}$ and $I_{int1} \neq I_{int2}$, a weighted difference may be used. For example, if $I_{int1} = a \cdot I_{int2}$, in which a is a scalar constant determined from calibration experiments, then the influence of an interfering source $V_{int}$ may be reduced or removed by obtaining:

$$I_1 - a I_2 = (1+a) I_{piezo} \quad (3)$$

In general, obtaining the difference of the measured signals $I_1$, $I_2$ may be performed by specifically configured circuits at the analogue signal level, or by post-processing following conversion to digital signals.

It is not necessary to know the absolute values of the interference capacitors $C_{int1}$, $C_{int2}$. From Equation (3), it may be observed that all that is needed is the ratio a of noise introduced on the first electrode 7 to that introduced to the second electrode 8. The ratio a may be obtained from calibration experiments, for example, by deliberately introducing a test signal that mimics an interference signal $V_{int}$ to the system and recording the response of the first and second measurement currents $I_1$, $I_2$ in the absence of applying any force to the piezoelectric sensor 1, i.e. such that $I_1 = I_{int1}$ and $I_2 = I_{int2}$. This information may be used to determine the correction ratio as $\alpha = I_1 / I_2$.

In practice, the correction may be performed by obtaining a difference of the first and second amplifier A1, A2 outputs $V_{out1}$, $V_{out2}$ in the fourth measurement circuit 6. This may be calibrated in the same way by obtaining a ratio of the outputs $V_{out1}$, $V_{out2}$ in response to a test signal and in the absence of any force applied to the piezoelectric sensor 1. If the ratio $\beta = V_{out1}/V_{out2}$ determined from calibration is not approximately unity, then a weighted difference $V_{out1} - \beta \cdot V_{out2}$ may be obtained by inserting appropriate impedances between the outputs $V_{out1}$, $V_{out2}$ of the first and second amplifiers A1, A2 and the respective inputs of the third amplifier A3. Alternatively, the third amplifier A3 may be omitted and a weighted difference $V_{out1} - \beta \cdot V_{out2}$ may be obtained by processing in the digital signal domain.

Figure 6:
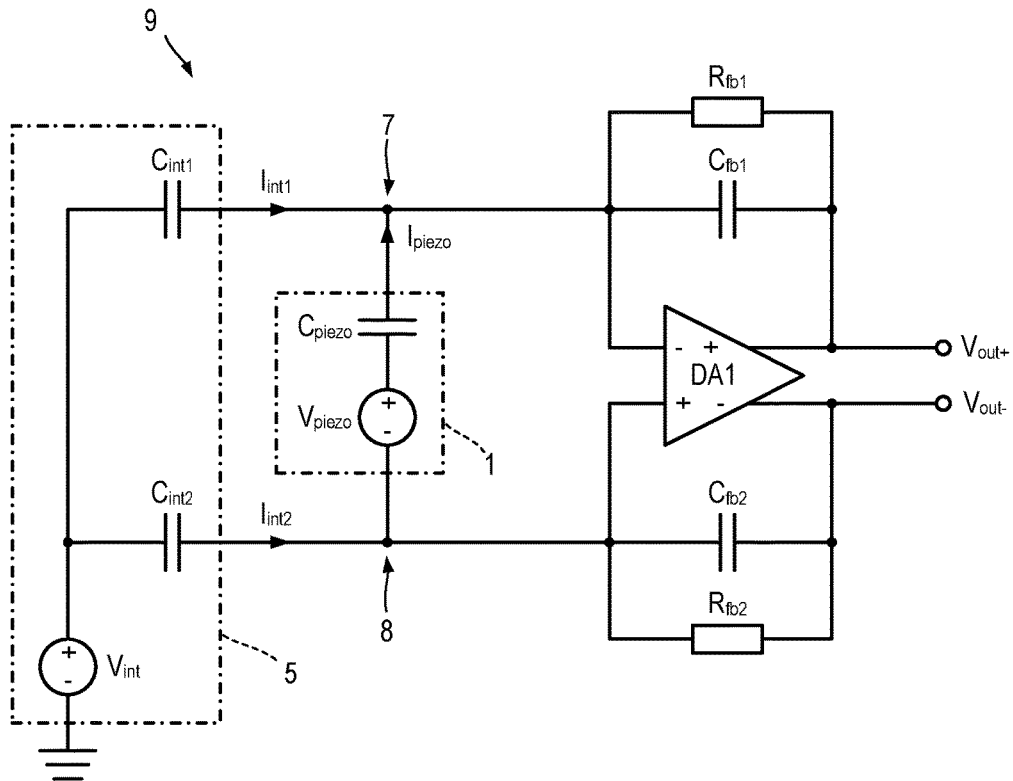
FIG. 6 is a circuit diagram of a fifth measurement circuit.

Referring also to FIG. 6, a fifth example of a measurement circuit 9 is shown.

In the fifth measurement circuit 9, a differential amplifier DA1 has one input connected to the first electrode 7 and the other input connected to the second electrode 8. The reduction or removal of influence of an interfering source $V_{int}$ may be implemented in the analogue domain by setting the values of a first feedback network $R_{fbi}$, $C_{fb1}$ and a second feedback network $R_{fb2}$, $C_{fb2}$ according to the ratio between the interfering capacitances $C_{int}$, $C_{int2}$. For example, by selecting $C_{fb1}/C_{fb2} = C_{int1}/C_{int2}$. Such selection may be performed through calibration experiments similar to those described hereinbefore and by using, for example, trimmer capacitors to provide the feedback capacitances $C_{fb1}$, $C_{fb2}$.

Differential Measurements in Touch Panels for Piezoelectric Pressure Measurements In the examples described hereinbefore, differential measurements have been described in relation to piezoelectric sensors 1 in which the first and second electrodes 7, 8 may be substantially co-extensive and of simple geometry. Such a configuration permits relatively simple differential measurements. However, in a practical touch panel for piezoelectric pressure measurements or combined capacitance and piezoelectric pressure measurements, a first electrode 7 may be one of many electrodes which share a common second electrode 8. Additionally, in some example a first electrode 7 may be an electrode which additionally functions as a receiving, Rx, and/or transmitting, Tx, electrode of a capacitance measurement system. In such touch panels, the second electrode 8 may be a common counter electrode having a relatively larger, or much larger, total area than each of a number of first electrodes 7. Providing separate, matched counter electrodes for each Rx and/or Tx electrode would require an additional patterned conductive layer or layers, and the associated electrical connections. Consequently, simple differential measurements as illustrated in relation to the fourth or fifth measurement circuits 6, 9 may not be practical.

Instead, the present specification describes methods for obtaining differential measurements of piezoelectric signals from a touchscreen for piezoelectric pressure measurements or for combined capacitance and piezoelectric pressure measurements which includes at least one, unpatterned common electrode (corresponding to the second electrode 8, sometimes referred to as a counter-electrode). The methods of the present specification are also applicable (with minor modifications) to touchscreens for piezoelectric pressure measurements or for combined capacitance and piezoelectric pressure measurements in which there are two or more second electrodes 8, each being common to two or more first electrodes 7.

First Apparatus

Figure 7:
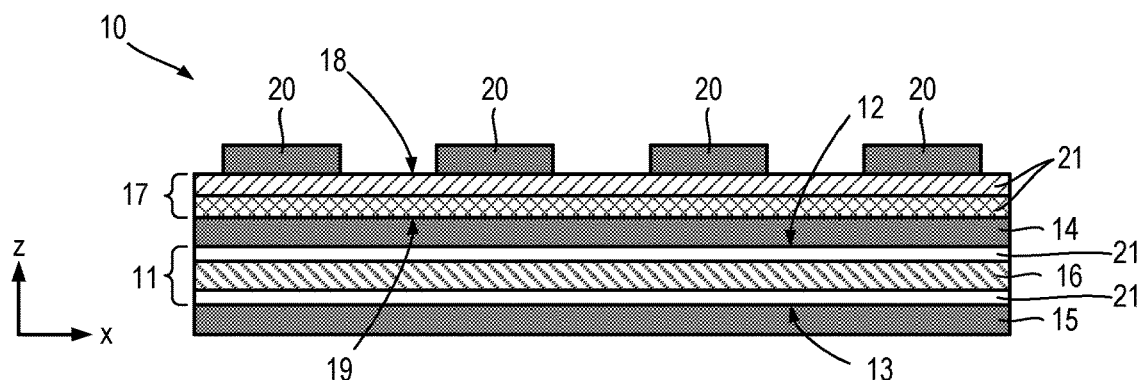
FIG. 7 is a cross-sectional view of a first touch panel for piezoelectric pressure measurements.

Referring to FIG. 7, a first example of a touch panel to for piezoelectric pressure measurements or combined capacitive and piezoelectric pressure measurements is shown.

he first touch panel to includes a first layer structure 11 having a first face 12 and a second, opposite, face 13. A number of first sensing electrodes 14 are disposed on the first face 12 of the first layer structure 11. Each of the first sensing electrodes 14 extends (or equivalently is elongated) in a first direction x, and the first sensing electrodes 14 are spaced apart in a second direction y. A common electrode 15 is disposed to substantially cover the second face 13 of the first layer structure 11.

The first layer structure n includes one or more layers, including at least a layer of piezoelectric material 16. Each layer included in the first layer structure 11 is generally planar and extends in first x and second y directions which are perpendicular to a thickness direction z. The one or more layers of the first layer structure 11 are arranged between the first and second faces 12, 13 such that the thickness direction z of each layer of the first layer structure 11 is substantially perpendicular to the first and second faces 12, 13.

The first touch panel 10 also includes a second layer structure 17 having a first face 18 and a second, opposite, face 19. A number of second sensing electrodes 20 are disposed on the first face 18 of the second layer structure 17. Each of the second sensing electrodes 20 extends (or equivalently is elongated) in the second direction y, and the second sensing electrodes 20 are spaced apart in a first direction x.

The second layer structure 17 includes one or more dielectric layers 21. Each dielectric layer 21 is generally planar and extends in first x and second y directions which are perpendicular to a thickness direction z. The one or more dielectric layers 21 of the second layer structure 17 are arranged between the first and second faces 18, 19 of the second layer structure 17 such that the thickness direction z of each dielectric layer 21 of the second layer structure 17 is perpendicular to the first and second faces 18, 19.

Preferably, the layer of piezoelectric material 16 includes or is formed of a piezoelectric polymer such as polyvinylidene fluoride (PVDF) or polylactic acid. However, the layer of piezoelectric material 16 may alternatively be a layer of a piezoelectric ceramic such as lead zirconate titanate (PZT). Preferably, the first and second sensing electrodes 14, 20, and the common electrode 15 are formed from silver nanowires. However, the first and second sensing electrodes 14, 20, and the common electrode 15 may alternatively be formed of transparent conductive oxides such as indium tin oxide (ITO) or indium zinc oxide (IZO). The first and second sensing electrodes 14, 20, and the common electrode 15 may be metal films such as aluminium, copper, silver or other metals suitable for deposition and patterning as a thin film. The first and second sensing electrodes 14, 20, and the common electrode 15 may be conductive polymers such as polyaniline, polythiphene, polypyrrole or poly(3,4-ethylenedioxythiophene) polystyrene sulfonate (PEDOT/PSS). The first and second sensing electrodes 14, 20, and the common electrode 15 may be formed from a metal mesh, metallic nanowires, graphene, and/or carbon nanotubes. The dielectric layer(s) 21 may include layers of a polymer dielectric material such as polyethylene terephthalate (PET) or layers of pressure sensitive adhesive (PSA) materials. However, the dielectric layer(s) 21 may include layers of a ceramic insulating material such as aluminium oxide.

The first layer structure 11 may include only the layer of piezoelectric material 16 such that the first and second opposite faces 12, 13 are faces of the piezoelectric material layer 16. Alternatively, the first layer structure 11 may include one or more dielectric layers 21 which are stacked between the layer of piezoelectric material 16 and the first face 12 of the first layer structure 11. The first layer structure 11 may include one or more dielectric layers 21 stacked between the second face 13 of the first layer structure 11 and the layer of piezoelectric material 16.

The second layer structure 17 may include only a single dielectric layer 21, such that the first and second faces 18,19 of the second layer structure 17 are faces of a single dielectric layer 21.

Figure 17:
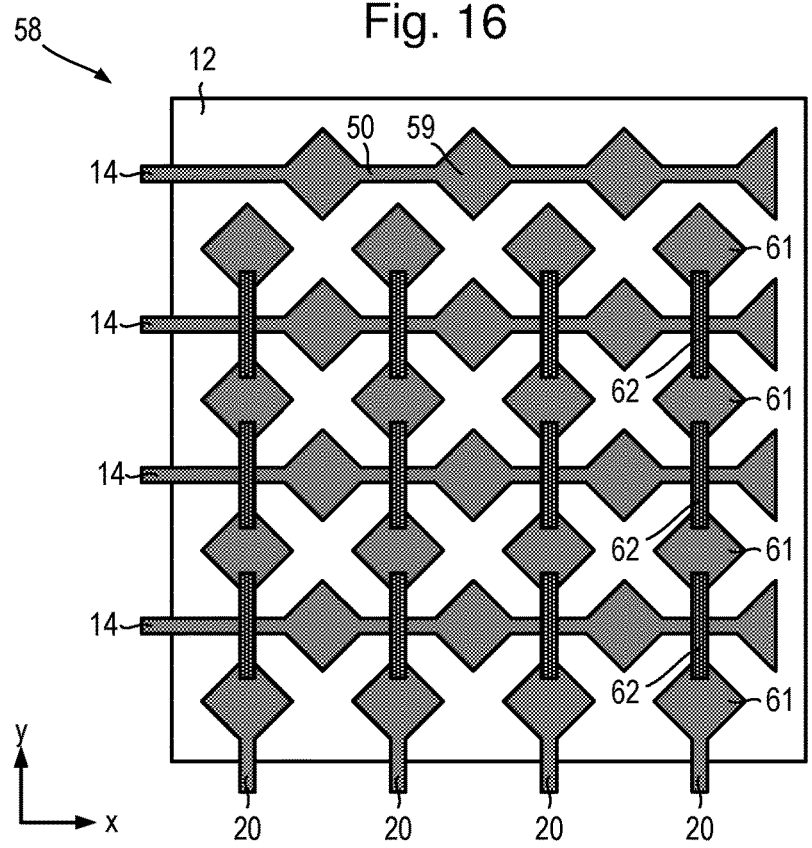
FIG. 17 is a plan view of a third touch panel for piezoelectric pressure measurements.

Alternatively, a second layer structure 17 need not be used (see FIG. 17), and the second sensing electrodes 20 may be disposed on the first face 12 along with the first sensing electrodes (FIG. 17).

In FIG. 7, the first touch panel 10 has been shown with reference to orthogonal axes labelled x, y, and z. However, the first, second and thickness directions need not form a right handed orthogonal set.

Figure 8:
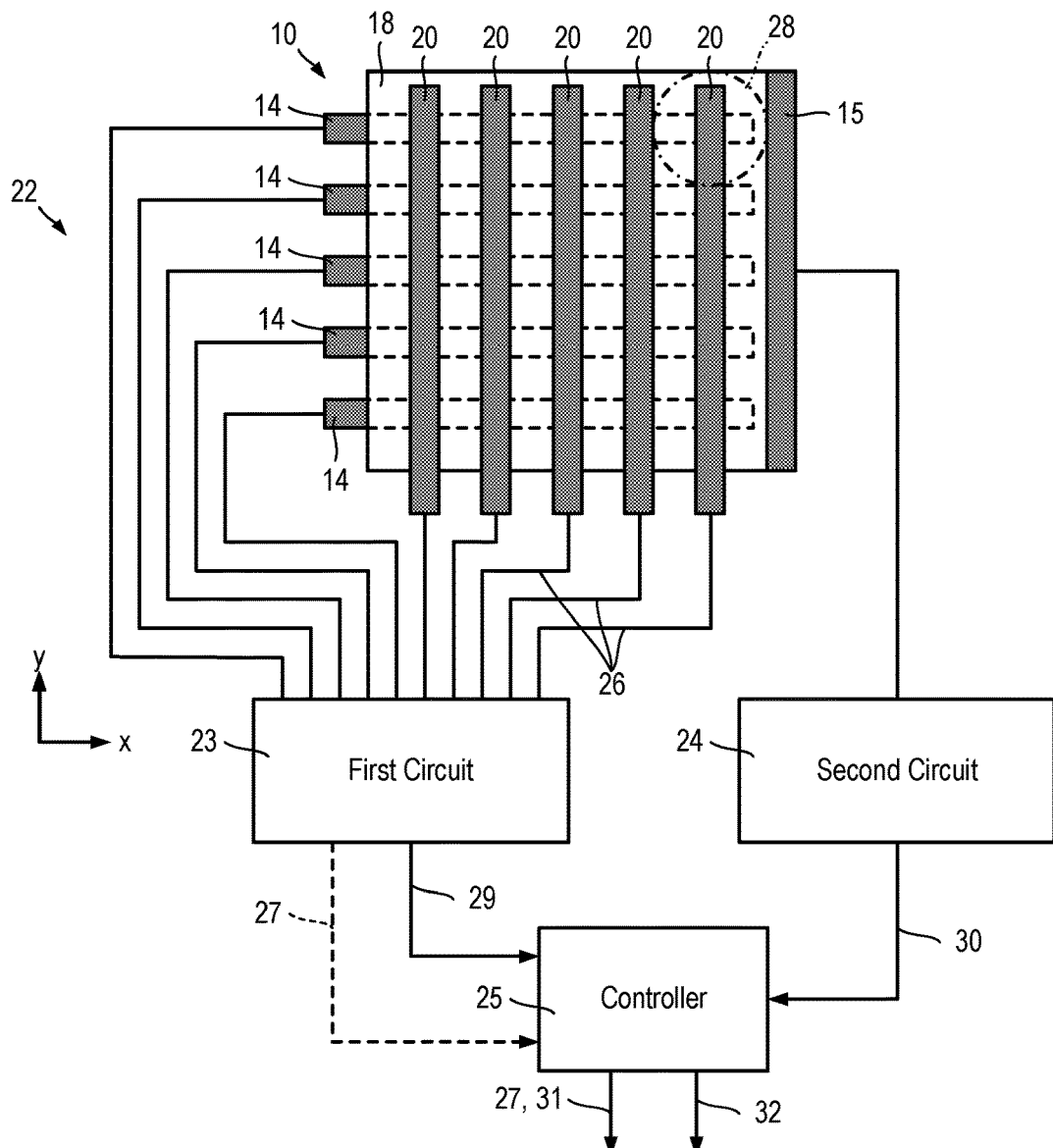
FIG. 8 illustrates a first apparatus for differential piezoelectric pressure measurements.

Referring also to FIG. 8, a first apparatus 22 for differential piezoelectric pressure measurements or combined capacitance and differential piezoelectric pressure measurements is shown.

The first apparatus 22 includes the first touch panel 10, a first circuit 23, a second circuit 24 and a controller 25. Each of the first and second sensing electrodes 14, 20 is connected to the first circuit 23 by a corresponding conductive trace 26. The common electrode 15 is connected to the second circuit 24.

The first circuit 23, the second circuit 24 and the controller 25 collectively provide a measurement circuit.

The first circuit 23 receives from, and may optionally transmit signals to, the first and second sensing electrodes 14, 20. The first circuit 23 measures a number of first piezoelectric pressure signals 29. The first circuit 23 is connectable to each of the first and second sensing electrodes 14, 20, in groups or individually. Each first piezoelectric pressure signal 29 corresponds to one or more of the first or second sensing electrodes 14, 20, and each first piezoelectric pressure signal 29 is indicative of a pressure acting on the touch panel 10 proximate to the respective one or more first or second sensing electrodes 14, 20. For example, the first circuit may measure or generate a first piezoelectric pressure signal 29 corresponding to each first sensing electrode 14 and a first piezoelectric pressure signal 29 corresponding to each second sensing electrode 20. Alternatively, each first piezoelectric pressure signal 29 may correspond to a pair of adjacent first or second sensing electrodes 14, 20, and so forth. Each sensing electrode 14, 20 contributes to one first piezoelectric pressure signal 29.

Optionally, the first circuit 23 may also measure mutual capacitance signals 27 corresponding to each intersection 28 of the first and second sensing electrodes 14, 20. In other examples, the first circuit 23 may instead measure self-capacitance signals corresponding to each first and second sensing electrode 14, 20. The first circuit 23 may determine the capacitance signals 27 and the first piezoelectric pressure signals 29 concurrently. Alternatively, the first circuit 23 may alternate between determining the capacitance signals 27 and the first piezoelectric pressure signals 29.

For example, the first circuit 23 may be configured for combined capacitance and piezoelectric pressure measurements as described in WO 2016/102975 A2, the entire contents of which are incorporated herein by reference. In particular, the first circuit 23 may be configured as described in relation to examples shown FIGS. 21 to 26 of WO 2016/102975 A2. Alternatively, the first circuit 23 may be configured for combined capacitance and piezoelectric pressure measurements as described in WO 2017/109455 A1, the entire contents of which are incorporated herein by reference. In particular, the first circuit 23 may be configured as described in relation to examples shown in FIGS. 4 to 21 of WO 2017/109455 A1. In other examples, the first circuit 23 may be configured as described hereinafter with reference in particular to FIGS. 13 to 17.

However, the methods of the present specification are not limited to these examples, and are applicable to any first circuit 23 which is capable of providing the hereinbefore described functions.

The second circuit 24 measures a second piezoelectric pressure signal 30 which corresponds to the common electrode 15. The second piezoelectric signal 30 should be indicative of a total pressure applied to the touch panel 10. When more than one common electrode 15 is used, a second piezoelectric signal 30 may be generated corresponding to each common electrode 15, for subsequent summation by the controller 25. Alternatively, when more than one common electrode 15 is used, the second circuit 24 may generate a single second piezoelectric signal 30 based on charges induced on all the common electrodes 15. Under ideal conditions and in the absence of external interference, a sum over the second piezoelectric pressure signals 30 and the first piezoelectric signals 29 should be approximately zero (up to a measurement error) because the sensing electrodes 14, 20 and the common electrode(s) 15 are arranged on opposite sides of any polarisation $\underline{P}$ induced in the layer of piezoelectric material 16.

The piezoelectric pressure signals 29, 30, and optionally the capacitance signals 27, are produced in response to a user interaction with the first touch panel 10, or with a layer of material overlying the first touch panel 10. In the following description, reference to a "user interaction" shall be taken to include a user touching or pressing a touch panel 10 or an overlying layer of material. The term "user interaction" shall be taken to include interactions involving a user's digit or a stylus (whether conductive or not). The term "user interaction" shall also be taken to include a user's digit or conductive stylus being proximate to a touch sensor or touch panel without direct physical contact (i.e. zero or negligible applied pressure).

The controller 25 receives the first and second piezoelectric pressure signals 29, 30, and generates corrected piezoelectric pressure values 32 which are output to a processor (not shown) which operates a device incorporating the first apparatus 22. The controller 25 generates a corrected piezoelectric pressure value 32 in the form of an estimate of the total pressure applied to the touch panel 10, based on a weighted difference of the second pressure signal 30 and a sum over the first pressure signals 29. For example, the controller 25 may generate a corrected piezoelectric pressure value 32 using Equations (13) or (21).

The controller 25 may also generate an estimate of the pressure acting on the touch panel proximate to a first sensing electrode 14, a group of first sensing electrodes 14, or each first sensing electrode 14, based on the respective first pressure signal(s) 29, the second pressure signal 30 and the total pressure. For example, the controller 25 may generate one or more corrected piezoelectric pressure values 32 using Equations (24) or (26) described hereinafter. Additionally or alternatively, the controller 25 may also generate an estimate of the pressure acting on the touch panel proximate to a second sensing electrode 20, a group of second sensing electrodes 20, or each second sensing electrode 20, based on the respective first pressure signal(s) 29, the second pressure signal 30 and the total pressure. For example, the controller 25 may generate corrected one or more piezoelectric pressure values 32 using Equations (23) or (25) described hereinafter.

The controller 25 may additionally or alternatively relay the raw first and/or second piezoelectric pressure signals 29, 30 to a processor (not shown) which operates a device (not shown) incorporating the first apparatus 22. In some examples, the processor (not shown) may alternatively perform some or all of the described functions of the controller 25.

In some examples, the controller 25 may determine touch location data 31 based on the first and second pressure signals 29, 30. The touch location data 31 indicates the locations, for example x, y coordinates, of one or more user interactions. The touch location data 31 is output to the processor (not shown) which operates the device (not shown) incorporating the first apparatus 22. Coefficients used for generating corrected piezoelectric pressure values 32 in the form of an estimate of the total pressure, a pressure acting on the touch panel proximate to one or more first sensing electrodes 14, and/or a pressure acting on the touch panel proximate to one or more second sensing electrodes 20, may depend upon the location x, y.

When measured, the controller 25 receives the capacitance signals 27 and either relays them to a processor (not shown) which operates a device (not shown) incorporating the first apparatus 22, or performs further processing of the capacitance values 27. For example, the controller 25 may process the capacitance values 27 to generate the touch location data 31 for output to the processor (not shown) which operates the device (not shown) incorporating the first apparatus 22. Capacitance signals 27 may permit more accurate determination of the touch location data 31 than the first and second pressure signals 29, 30 alone.

First Method of Measurement

Figure 9:
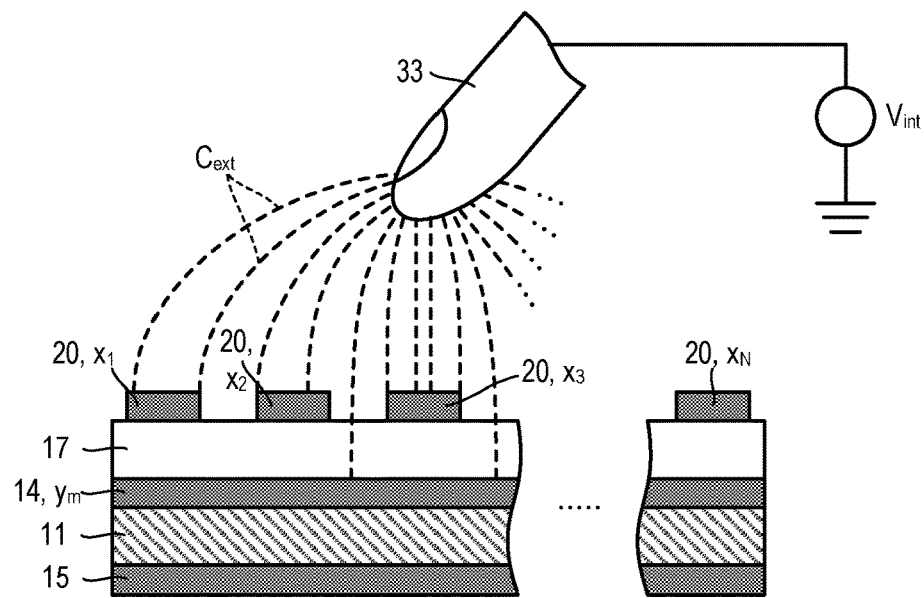
FIGS. 9 and 10 illustrate methods of obtaining differential piezoelectric pressure measurements.
Figure 10:
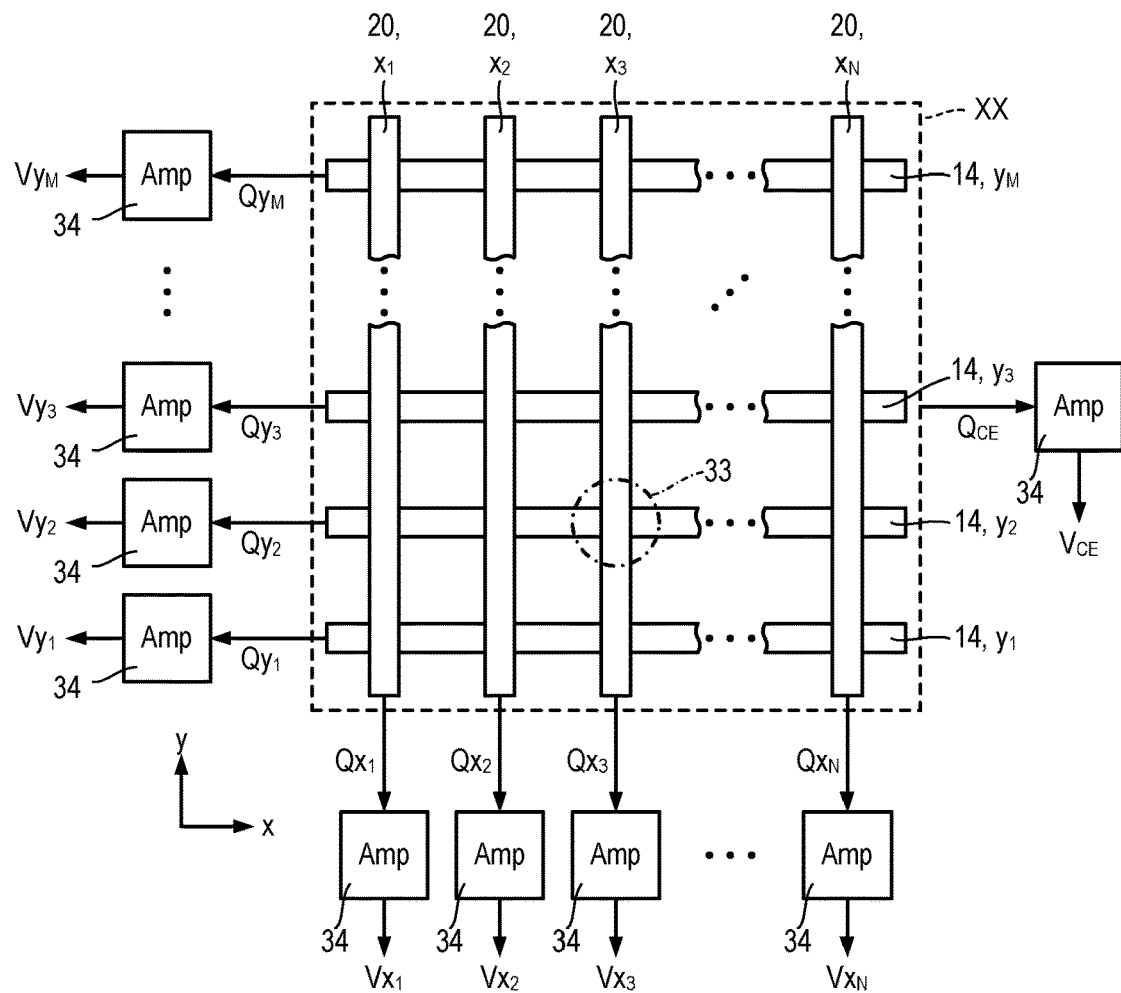

Referring also to FIGS. 9 and 10, a first method of performing differential piezoelectric pressure measurements will be described.

An object 33, for example a user's digit, which is proximate to or touching the touch panel 10 may become charged to a potential $V_{int}$ by electrostatic charging or from acting as an antenna for a source $V_{int}$ of electromagnetic interference. There is a capacitive coupling $C_{ext}$ between the object 33 and the overall assemblage of all of the sensing electrodes 14, 20 and the common electrode 15. A total electrostatic charge $Q_{ES}$ is induced in the overall assemblage of all of the sensing electrodes 14, 20 and the common electrode 20 as approximately $Q_{ES}=C_{ext}.V_{int}$. It should be noted that it may not be possible to calibrate $C_{ext}$ in practice, because the precise geometry will be continually changing as a user moves their digit and/or stylus in relation to the touch panel 10, and also will vary between different users and different digits of the same user. Additionally, $V_{int}$ may not be measureable in general.

The first method of the specification is based on the premise that an unknown, total electrostatic charge $Q_{ES}$ induced on the electrodes 14, 15, 20 will be made up of a sum of individual electrostatic charges induced on each of the electrodes 14, 15, 20.

Hereinafter, the $m^{th}$ of M first sensing electrodes 14 may alternatively be denoted as $y_m$ and the $n^{th}$ of N second sensing electrodes 20 may alternatively be denoted as $x_n$. If the electrostatic charge induced on the $n^{th}$ of N second sensing electrodes 20, $x_n$ by the object 33 is denoted $Sx_n$ and so forth, the electrostatic charge induced on the $m^{th}$ of M first sensing electrodes 14, $y_m$ by the object 33 is denoted $Sy_m$ and so forth, and the electrostatic charge induced on the counter electrode 15 by the object 33 is denoted $S_{CE}$, then the total electrostatic charge $Q_{ES}$ may be approximated as:

$$Q_{ES} = \Sigma_{n=1}^{N} Sx_n + \Sigma_{m=1}^{M} Sy_m + S_{CE} \quad (4)$$

The electrostatic charges $Sx_n$, $Sy_m$, $S_{CE}$ induced on individual electrodes $x_n$, $y_m$, 15 may alternately be expressed as fractions of the total electrostatic charge induced $Q_{ES}$. For example, the electrostatic charge $Sx_n$ may be written as $Sx_n = k_n \cdot Q_{ES}$, in which $k_n$ is the fraction of the total electrostatic charge $Q_{ES}$ induced on the $n^{th}$ of N second sensing electrodes $x_n$. Similarly, the electrostatic charge $Sy_m$ may be written as $Sy_m = h_m \cdot Q_{ES}$, in which $h_M$ is the fraction of the total electrostatic charge $Q_{ES}$ induced on the $m^{th}$ of M first sensing electrodes $y_m$. Further, the electrostatic charge $S_{CE}$ may be written as $S_{CE} = C_{CE} \cdot Q_{ES}$, in which $C_{CE}$ is the fraction of the total electrostatic charge $Q_{ES}$ induced on the counter electrode 15. Substituting these expressions into Equation (4):

$$Q_{ES} = \sum_{n=1}^{N} k_n Q_{ES} + \sum_{m=1}^{M} h_m Q_{ES} + C_{CE} Q_{ES} \quad (5)$$

$$1 = \sum_{n=1}^{N} k_n + \sum_{m=1}^{<} h_m + C_{CE}$$

$$1 = C_x + C_y + C_{CE}$$

in which:

$$C_x = \Sigma_{n=1}^{N} k_n, \quad C_y = \Sigma_{m=1}^{M} h_m \quad (6)$$

In general, the fractions $k_n$, $h_m$, $C_x$, $C_y$, and $C_{CE}$ will all be a function of the touch coordinates, denoted x, y, at which the object 33 contacts the touch panel 10. In other words, the fraction $k_n$ is typically not a constant, and may be a function $k_n(x,y)$ of the touch coordinates x, y. Similarly, the other fractions may also be functions of touch position, namely $h_m(x,y)$, $C_x(x,y)$, $C_y(x,y)$ and $C_{CE}(x,y)$. The fractions $k_n$, $h_m$, $C_x$, $C_y$, and $C_{CE}$ may be calibrated by performing appropriate calibration experiments with known $V_{int}$ and known touch positions x, y. However, because of the position dependent nature of the fractions $k_n$, $h_m$, $C_x$, $C_y$, and $C_{CE}$, full calibration may require a large number of calibration experiments to be performed for a given touch panel 10.

When polarisation $\underline{P}$ of the piezoelectric material layer 16 is induced between the common electrode 15 and the sensing electrodes $x_n$, $y_m$, the charges induced on the sensing electrodes $x_n$, $y_m$, have opposite polarity to the charges induced on the common electrode 15. In other words, external coupling to the object 33 induces charge flow between system ground or common mode voltage and the overall assemblage of all of the electrodes $x_n$, $y_m$, 15, whereas by contrast a polarisation $\underline{P}$ of the piezoelectric material layer 16 induces charge to flow between the counter electrode is and the sensing electrodes $x_n$, $y_m$. One consequence, as explained hereinbefore, is that charges induced by the polarisation $\underline{P}$ of the piezoelectric material layer 16 are expected to sum to zero, at least to within a measurement error.

If the piezoelectric charge induced on the $n^{th}$ of N second sensing electrodes $x_n$ by a polarisation $\underline{P}$ of the piezoelectric material layer 16 is denoted $Fx_n$ and so forth, the piezoelectric charge induced on the $m^{th}$ of M first sensing electrodes $y_n$ by a polarisation $\underline{P}$ of the piezoelectric material layer 16 is denoted $Fy_m$ and so forth, and the piezoelectric charge induced on the counter electrode 15 by a polarisation $\underline{P}$ of the piezoelectric material layer 16 is denoted $F_{CE}$, then a total induced piezoelectric charge $Q_{PT}$ may be approximated as:

$$Q_{PT} = 0 = \Sigma_{n=1}^{N} Fx_n + \Sigma_{m=1}^{M} Fy_m + F_{CE} \quad (7)$$

It may be noted that the piezoelectric charge $F_{CE}$ induced on the counter electrode 15 may provide a good measure of the total force applied to the touch panel 10.

Referring in particular to FIG. 10, the charge induced on the $n^{th}$ of N second sensing electrodes $x_n$, 20 may be written as:

$$Qx_n = Sx_n + Fx_n$$

$$Qx_n = k_n Q_{ES} + Fx_n \quad (8)$$

Similarly, the charge induced on the $m^{th}$ of M first sensing electrodes $y_m$, 14 may be written as:

$$Qy_m = h_m Q_{ES} + Fy_m \quad (9)$$

and the charge induced on the counter electrode 15 may be written as:

$$Q_{CE} = C_{CE} Q_{ES} + F_{CE} \quad (10)$$

In the first method of measurement, the charges $Qx_n$, $Qy_m$ measured by all of the sensing electrodes $x_n$, $y_m$ are summed to yield:

$$Q_{sen} = \sum_{n=1}^{N} Qx_n + \sum_{m=1}^{M} Qy_m \quad (11)$$

$$Q_{sen} = \sum_{n=1}^{N} (k_n Q_{ES} + Fx_n) + \sum_{m=1}^{M} (h_m Q_{ES} + Fy_m)$$

$$Q_{sen} = Q_{ES} \left( \sum_{n=1}^{N} k_n + \sum_{m=1}^{M} h_m \right) + \sum_{n=1}^{N} Fx_n + \sum_{m=1}^{M} Fy_m$$

$$Q_{sen} = Q_{ES}(1 - C_{CE}) - F_{CE}$$

In which $Q_{sen}$ is the sum of all the charges measured by all of the sensing electrodes $x_n$, $y_m$, and in which Equations (5) and (7) have been employed to obtain the final expression for the $Q_{sen}$. The total induced electrostatic charge $Q_{ES}$ may be eliminated between Equations (10) and (11) to yield:

$$\frac{Q_{CE} - F_{CE}}{C_{CE}} = Q_{ES} = \frac{Q_{sen} + F_{CE}}{(1 - C_{CE})} \quad (12)$$

Which may re-arranged for the piezoelectric charge $F_{CE}$ induced on the counter electrode 15 as:

$$F_{CE} = (1 - C_{CE}) Q_{CE} - C_{CE} Q_{sen} \quad (13)$$

In which the charge $Q_{CE}$ induced on the counter electrode 15 may be measured, the summed charge $Q_{sen}$ on the sensing electrodes $x_n$, $y_n$ may be obtained by summing all of the measured charges $Qx_1$, $Qx_2$, . . . , $Qx_N$ and $Qy_1$, $Qy_2$, . . . , $Qy_M$. The fraction $C_{CE}$ may be determined in advance through calibration experiments using an object 33 charged, connected or coupled to a known interfering potential $V_{int}$ and at a known location x, y with respect to the touch panel 10. As mentioned hereinbefore, the fraction $C_{CE}$ is in general a function of touch location x, y, i.e. $C_{CE}=C_{CE}(x,y)$. The appropriate value of $C_{CE}(x,y)$ may be obtained, for example, by using capacitance signals 27 or touch location data 31 to provide the touch location x, y. Alternatively, in a piezoelectric only touch panel system, the touch location x, y may be inferred from the raw first piezoelectric signals 29.

In this way, using the first method and Equation (13), a total piezoelectric charge $F_{CE}$ may be determined in which the effects of external electrical interference from an object 33 may be reduced or eliminated. The total piezoelectric charge $F_{CE}$ depends on the straining of the piezoelectric material layer 16, and hence depends on the force applied to the touch panel 10 by a user input.

In practice, the charges $Qx_n$, $Qy_m$, $Q_{CE}$ may be detected using charge amplifiers 34, such that a voltage output corresponding to the $n^{th}$ of N second sensing electrodes $x_n$, 20 is $Vx_n$, and is related to $Qx_n$ and so forth. Commonly, a charge amplifier 34 will integrate the input current. For example, if the current on the $n^{th}$ of N second sensing electrodes $x_n$ is $Ix_n$, then the voltage $Vx_n$ on the $n^{th}$ of N second sensing electrodes $x_n$ at a time t may, under ideal conditions, be expressed as:

$$Vx_n = Gx_n Qx_n = Gx_n \int_0^t Ix_n(\tau) d\tau \qquad (14)$$

In which $Gx_n$ is the gain of the $n^{th}$ of N charge amplifiers 34 connected to the N second sensing electrodes $x_n$ and $\tau$ is an integration variable. Similarly, the voltage on the $m^{th}$ of M first sensing electrodes $y_m$ may be expressed as:

$$Vy_m = Gy_m Qy_m = Gy_m \int_0^t Iy_m(\tau) d\tau \qquad (15)$$

In which Gym is the gain of the mot of M charge amplifiers 34 connected to the M first sensing electrodes $y_n$, $Iy_m$ is the current on the $m^{th}$ of M first sensing electrodes $y_m$ and $\tau$ is an integration variable. Similarly, the voltage on the common electrode may be expressed as:

$$V_{CE} = G_{CE} Q_{CE} = G_{CE} \int_0^t I_{CE}(\tau) d\tau \qquad (16)$$

In which $G_{CE}$ is the gain of the charge amplifier 34 connected to the common electrode 15, $I_{CE}$ is the current on the common electrode 15 and $\tau$ is an integration variable. The charge amplifier signals 34 corresponding to all of the sensing electrodes $x_n$, $y_m$ may then be summed to yield a summed voltage signal, $V_{sen}$:

$$V_{sen} = \sum_{n=1}^N Vx_n + \sum_{m=1}^M Vy_m \qquad (17)$$

$$V_{sen} = \sum_{n=1}^N Gx_n Qx_n + \sum_{m=1}^M Gy_m Qy_m$$

If the gains are all substantially equal such that $Gx_n \approx Gy_m \approx G$, with G denoting a common gain value, then Equation (17) may be simplified to:

$$V_{sen} = G\left(\sum_{n=1}^N Qx_n + \sum_{m=1}^M Qy_m\right) \qquad (18)$$

$$V_{sen} = GQ_{sen}$$

$$V_{sen} = G(Q_{sen}(1 - C_{CE}) - F_{CE})$$

Similarly, if $G_{CE} \approx G$, then Equation (10) may be re-written in terms of the corresponding charge amplifier 34 output as:

$$V_{CE} = GQ_{CE}$$

$$V_{CE} = G(C_{CE} Q_{ES} + F_{CE}) \qquad (19)$$

Eliminating $Q_{ES}$ between Equations (18) and (19), the voltage analogue of Equation (12) may be obtained as:

$$\frac{\frac{V_{CE}}{G} F_{CE}}{C_{CE}} = Q_{ES} = \frac{\frac{V_{sen}}{G} + F_{CE}}{(1 - C_{CE})} \qquad (20)$$

Equation (20) may equally be obtained by simply substituting $Q_{CE}=V_{CE}/G$ and $Q_{sen}=V_{sen}/G$ into Equation (12). Re-arranging Equation (20) for $F_{CE}$, or equivalently substituting $Q_{CE}=V_{CE}/G$ and $Q_{sen}=V_{sen}/G$ into Equation (13), yields an expression for the piezoelectric charge $F_{CE}$ induced on the counter electrode 15 in terms of charge amplifier 34 voltage outputs as:

$$F_{CE} = (1 - C_{CE}) \frac{V_{CE}}{G} - C_{CE} \frac{V_{sen}}{G} \qquad (21)$$

Thus, it is apparent that provided the charge amplifier 34 gains are approximately equal to a common gain, G, i.e. $Gx_n \approx Gy_m \approx G_{CE} \approx G$, then the relationships derived in terms of induced charges may be equally applicable to the corresponding outputs of charge amplifiers 34. Of course, perfect identity would not be expected in practical circumstances because the charge amplifier 34 gains $Gx_n$, $Gy_m$, $G_{CE}$ will not be perfectly identical to a common gain value G. Furthermore, each charge amplifier 34 will in practice experience DC offsets and drift, in addition to time-dependent decay of low frequency and DC components in the voltage output (sometimes referred to as "roll-off"). Nonetheless, provided that the charge amplifier 34 gains are approximately equal to a common gain value G, i.e. $Gx_n \approx Gy_m \approx G_{CE} \approx G$, Equation (21) may be used to generate a corrected signal 32 in which the influence of coupling to external electrical fields may be at least partially cancelled.

Second Method of Measurement

The second method of measurement is an extension of the first method of measurement, and may be used to estimate values of piezoelectric charge $Fx_n$, $Fy_m$, for individual sensing electrodes $x_n$, $y_m$, based on a weighted correction using the charge $Q_{CE}$ measured on the counter electrode 15 and the estimated piezoelectric charge $F_{CE}$ on the counter electrode 15.

Referring again to Equation (8), for the $n^{th}$ of N second sensing electrodes $x_n$, 20:

$$Qx_n = k_n Q_{ES} + Fx_n \qquad (8)$$

Referring again to Equation (10), for the counter electrode 15:

$$Q_{CE} = C_{CE} Q_{ES} + F_{CE} \qquad (10)$$

Eliminating the total electrostatic charge $Q_{ES}$ between Equations (8) and (10):

$$\frac{Qx_n - Fx_n}{k_n} = Q_{ES} = \frac{Q_{CE} - F_{CE}}{C_{CE}} \qquad (22)$$

Which may be re-arranged for the piezoelectric charge $Fx_n$ of the $n^{th}$ of N second sensing electrodes $x_n$, 20 as:

$$Fx_n = Qx_n - \frac{k_n}{C_{CE}}(Q_{CE} - F_{CE}) \tag{23}$$

In which the charge $Q_{CE}$ induced on the counter electrode 15 may be measured and the charge $Qx_n$ induced on the $n^{th}$ of N second sensing electrodes $x_n$, 20 may be measured. The total piezoelectric charge $F_{CE}$ may be determined from the first method using Equation (13). The fractions $k_n$ and $C_{CE}$ may be determined in advance through calibration experiments performed using an object 33 charged, connected or coupled to a known interfering potential $V_{int}$, whilst the object 33 is arranged at a known location x, y with respect to the touch panel 10. As mentioned hereinbefore, the fractions $k_n$ and $C_{CE}$ are in general functions of touch location x, y, i.e. $k_n = k_n(x,y)$ and $C_{CE} = C_{CE}(x,y)$. The appropriate values of $k_n(x,y)$ and $C_{CE}(x,y)$ may be obtained by using the capacitance signals 27 or touch location data 31 to provide the touch location x, y.

In this way, a piezoelectric charge $Fx_n$ for the $n^{th}$ of N second sensing electrodes $x_n$, 20 may be estimated for which the effects of external interference from a non-ground potential of the object 33 are reduced or eliminated.

Similarly, for the $m^{th}$ of M first sensing electrodes $y_m$, 14, a piezoelectric charge $Fy_m$ for which the effects of external interference from a non-ground potential of the object 33 are reduced or eliminated may be obtained using:

$$Fy_m = Qy_m - \frac{h_m}{C_{CE}}(Q_{CE} - F_{CE}) \tag{24}$$

In practice, the charges $Qx_n$, $Qy_m$, $Q_{CE}$ may be detected using charge amplifiers 34, such that a voltage output corresponding to the $n^{th}$ of N second sensing electrodes $x_n$, 20 is $Vx_n$, and so forth. Similar to the first method, if the charge amplifier 34 gains are approximately equal to a common gain value G, i.e. $Gx_n \approx Gy_m \approx G_{CE} \approx G$, then Equation (23) may be re-expressed in terms of charge amplifier 34 voltage outputs as:

$$Fx_n = \frac{Vx_n}{G} - \frac{k_n}{C_{CE}}\left(\frac{V_{CE}}{G} - F_{CE}\right) \tag{25}$$

Similarly, Equation (24) may be re-expressed in terms of charge amplifier 34 voltage outputs as:

$$Fy_m = \frac{Vy_m}{G} - \frac{h_m}{C_{CE}}\left(\frac{V_{CE}}{G} - F_{CE}\right) \tag{26}$$

Experimental Data

Figure 11:
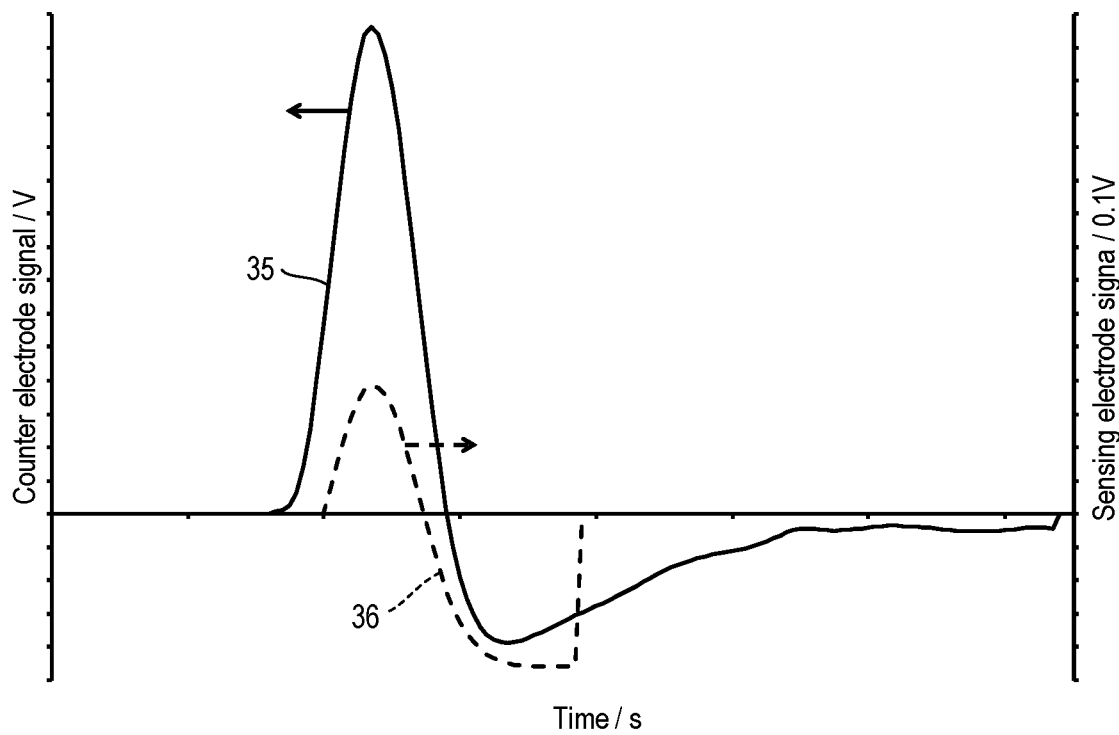
FIG. 11 shows measured signals corresponding to externally induced charges on a sensing electrode and a common electrode.

Referring also to FIG. 11, experimental data illustrating externally induced charges on a sensing electrode $x_n$, $y_m$ and the common electrode 15 are shown.

A first voltage signal 35 (solid line) corresponds to a charge amplifier 34 output measured for the common electrode 15. A second voltage signal 36 (dashed line) corresponds to a charge amplifier output measured for a sensing electrode $x_n$, $y_m$. The signals 35, 36 shown in FIG. 11 were obtained using an object 33 in the form of a digit charged to an electrostatic potential and held nearly touching a touch panel 10. No pressure was applied to the touch panel 10.

It may be observed that in FIG. 11, the first and second voltage signals 35, 36 have corresponding signs (in other words the signals have substantially the same polarities at a given time).

Figure 12:
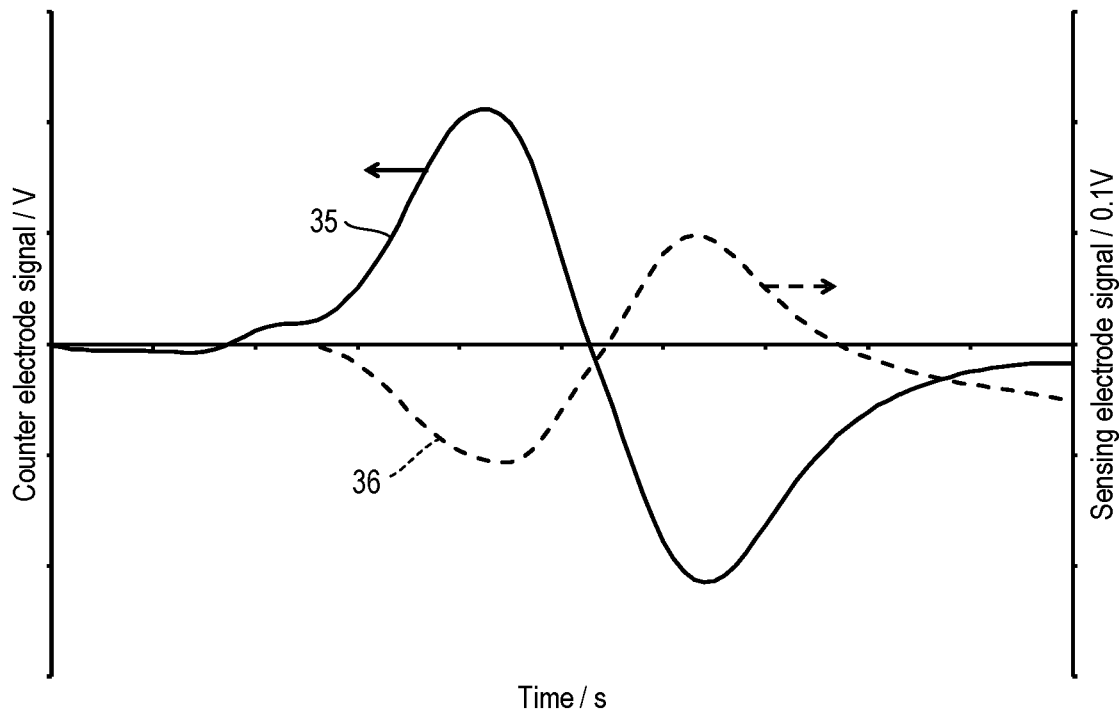
FIG. 12 shows measured signals corresponding to piezoelectric induced charges on a sensing electrode and a common electrode.

Referring also to FIG. 12, experimental data illustrating piezoelectric induced charges on a sensing electrode $x_n$, $y_m$ and the common electrode are shown.

The first and second voltage signals 35, 36 correspond respectively to the common electrode 15 and a sensing electrode $x_n$, $y_m$ in the same way as FIG. 11. However, the data shown in FIG. 12 was captured in response to tapping the touch panel 10 using a non-conductive object, in order to generate piezoelectric pressure signals which are substantially free of noise from external electric fields.

It may be observed that in FIG. 12, the first and second voltage signals 35, 36 have opposite signs (in other words the signals have substantially opposite polarities at a given time).

The observed polarities do not precisely correspond to the ideal case in either of FIG. 11 or 12, which is thought to be as a result of small variations in DC offsets and other sources of measurement error.

Second Apparatus

Apparatuses for combined capacitance and pressure sensing have been described in WO 2016/102975 A2, in particular with reference to FIGS. 22 to 26 of this document.

In order to aid understanding of the second apparatus 37 (FIG. 13) of the present specification, it may be helpful to briefly discuss the operation of apparatuses for combined capacitance and pressure sensing as described in WO 2016/102975 A2. The discussion hereinafter is made with reference to the structure of the first touch panel 10 of the present specification.

The layer of piezoelectric material 16 is poled. Consequently, the pressure applied by a user interaction will cause a strain which induces a polarisation $\underline{P}$ of the layer of piezoelectric material 16. The polarisation $\underline{P}$ of the layer of piezoelectric material 16 results in an induced electric field $\underline{E}_p$, which has a component $\underline{E}_z$ in the thickness direction. The deformation which produces the polarisation $\underline{P}$ may result from a compression or a tension. The deformation which produces the polarisation $\underline{P}$ may be primarily an in-plane stretching of the piezoelectric material layer 16 in response to the applied pressure of a user interaction.

The induced electric field $\underline{E}_p$ produces a potential difference between the common electrode 15 and any one of the sensing electrodes 14, 20. Electrons flow on or off the electrodes 14, 15, 20 until the induced electric field $\underline{E}_p$ is cancelled by an electric field $\underline{E}_q$ produced by the charging of the electrodes 14, 15, 20. In other words, the electric field $\underline{E}_q$ results from the charges $Fx_n$, $Fy_m$, $F_{CE}$.

When the touch panel 10 is used for combined capacitance and pressure sensing, signals received from the sensing electrodes 14, 20 generally take the form of a superposition of a piezoelectric signal pressure signal and an applied or sensed capacitance measurement signal. Apparatuses for combined capacitance and pressure sensing as described in WO 2016/102975 A2 in particular with reference to FIGS. 22 to 26, operate by using first and second frequency dependent filters (not shown) to separate signals received from the sensing electrodes 14, 20 into a first component including capacitance information and a second component including piezoelectric pressure information. The first and second frequency dependent filters (not shown) may be physical filters, or may be applied during digital signal processing. This is possible because piezoelectric pressure signals and capacitance measurement signals generally have different, separable frequency contents.

For example, mutual capacitances between a pair of sensing electrodes 14, 20 may typically fall within the range of 0.1 to 3000 pF or more, and preferably 100 to 2500 pF. In order to effectively couple to capacitances in this range, a capacitance measurement signal may typically have a base frequency of greater than or equal to 10 kHz, greater than or equal to 20 kHz, greater than or equal to 50 kHz or greater than or equal to 100 kHz. By contrast, piezoelectric pressure signals typically include a broadband frequency content spanning a range from several Hz to several hundreds or thousands of Hz. This is at least in part because piezoelectric pressure signals arise from user interactions by a human user.

Figure 13:
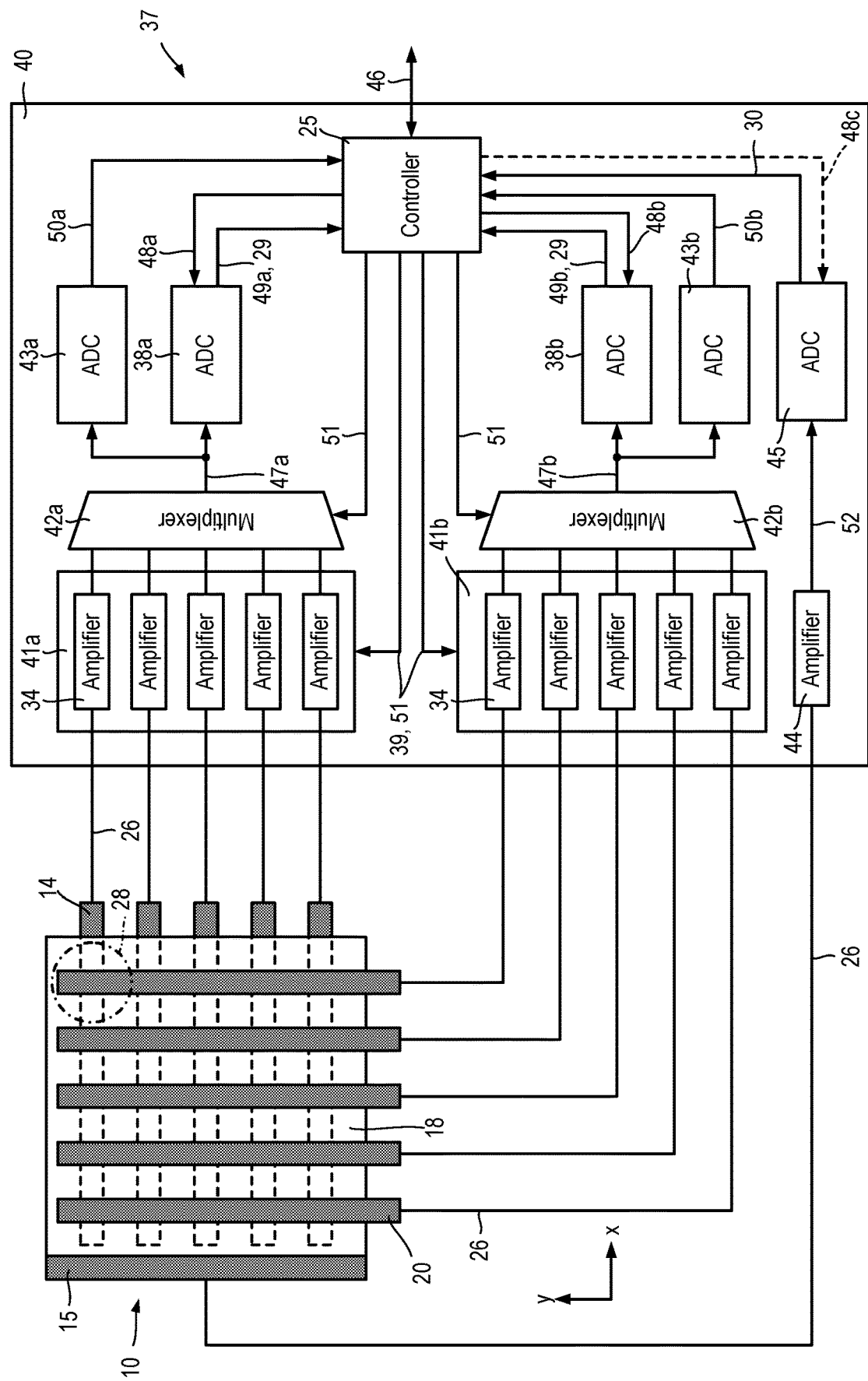
FIG. 13 illustrates a second apparatus for differential piezoelectric pressure measurements.

Referring also to FIG. 13, a second apparatus 37, for combined capacitance and differential piezoelectric pressure measurements, is shown.

In the apparatuses described in WO 2016/102975 A2, the first and second frequency dependent filters (not shown) are implemented in hardware as a part of front end modules, or in the digital domain, for example by a controller.

By contrast, the second apparatus 37 of the present specification implements first frequency dependent filters to select the first piezoelectric pressure signals 29 using analog-to-digital converters (ADC) 38a, 38b which are synchronised with a capacitance measurement signal 39 at a first sampling frequency $f_{piezo}$. The second apparatus 37 implements a second frequency dependent filter in the digital domain to obtain capacitance signals 27. For example, by application of a digital high-pass filter, or by using the more recently sample value, or values, of the first piezoelectric pressure signals 29 to provide a baseline.

The second apparatus 37 includes a first touch panel 10 and a touch controller 40 for combined capacitance and differential pressure sensing. The second apparatus 37 may be incorporated into an electronic device (not shown) such as, for example, a mobile telephone, a tablet computer, a laptop computer and so forth. The first touch panel lo may be bonded overlying the display (not shown) of an electronic device (not shown). In this case, the materials of the first touch panel 10 should be substantially transparent. A cover lens (not shown) may be bonded overlying the first touch panel 10. The cover lens (not shown) is preferably glass but may be any transparent material.

The touch controller 40 includes a controller 25. The touch controller 40 also includes a first circuit 23 including a pair of amplifier modules 41a, 41b a pair of multiplexers 42a, 42b, a pair of primary ADCs 38a, 38b and a pair of secondary ADCs 43a, 43b. The touch controller also includes a second circuit 24 including a common electrode charge amplifier 44 and a common electrode ADC 45. The controller 25 may communicate with one or more processors (not shown) of an electronic device (not shown) using a link 46. The controller 25 includes a signal source (not shown) for providing a driving capacitance measurement signal 39, $V_{sig}(t)$ (FIG. 14, also referred to as "driving signal" for brevity hereinafter) to one or both of the amplifier modules 41a, 41b).

The second apparatus 37 will be described with reference to an example in which the driving signal 39, $V_{sig}(t)$ is supplied to the first amplifier module 41a, such that the first sensing electrodes 14 are transmitting, Tx electrodes, and the second sensing electrodes 20 are receiving, Rx electrodes.

Each amplifier module 41a, 41b includes a number of separate charge amplifiers 34. Each charge amplifier 34 of the first amplifier module 41a is connected to a corresponding first sensing electrode 14 via a conductive trace 26. The output of each charge amplifier 34 of the first amplifier module 41a is connected to a corresponding input of the first multiplexer 42a. In this way, the first multiplexer 42a may output an amplified signal 47a corresponding to an addressed first sensing electrode 14.

The first primary ADC 38a receives the amplified signal 47a corresponding to a presently addressed first sensing electrode 14 from the first multiplexer 42a output. The amplified signal 47a corresponding to a presently addressed first sensing electrode 14 includes a superposition of the driving signal 39, $V_{sig}(t)$ and a piezoelectric pressure signal 29, $V_{piezo}(t)$. The first primary ADC 38a also receives a first synchronisation signal 48a from the controller 25 (also referred to as a "clock signal"). The first synchronisation signal 48a triggers the first primary ADC 38a to obtain samples at a first sampling frequency $f_{piezo}$ and at times corresponding to the amplitude of the driving signal 39, $V_{sig}(t)$ being substantially equal to a ground, common mode or minimum value. In this way, the first primary ADC 38a may obtain a first filtered signal 49a in the form of a sampled signal which corresponds approximately to a piezoelectric pressure signal 29, $V_{piezo}(t)$ generated by the first sensing electrode 14 connected with the first multiplexer 42a. The first synchronisation signal 48a need not trigger the first primary ADC 38a to obtain samples during every single period of the driving signal 39, $V_{sig}(t)$, and instead may trigger the first primary ADC 38a to obtain samples during, for example, every other period, every tenth period, every hundredth period and so forth.

Figure 14A:
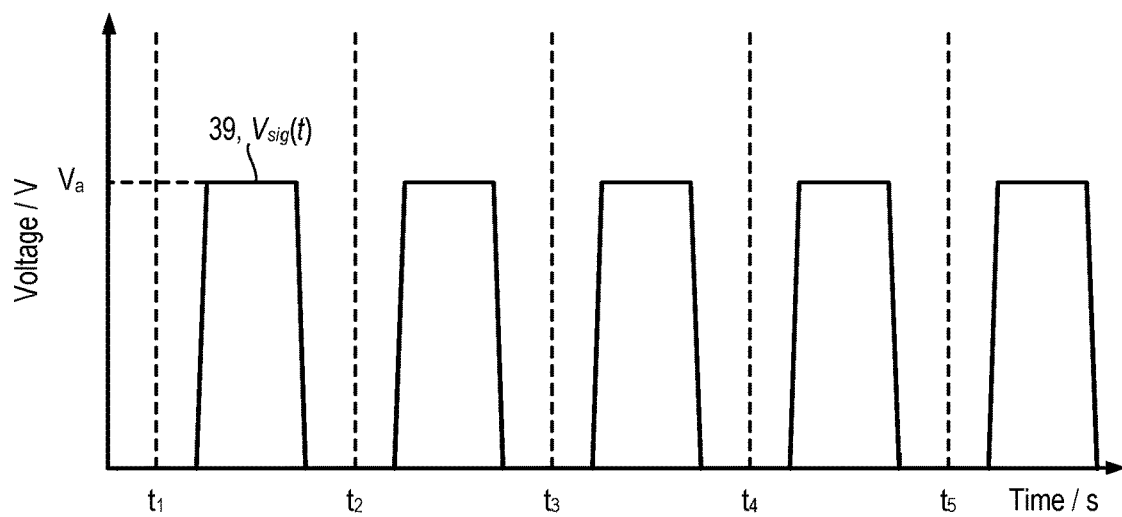
FIGS. 14A to 14C illustrate separating superposed capacitive and piezoelectric pressure signals using an analog-to-digital convertor synchronised to a driving signal.
Figure 14B:
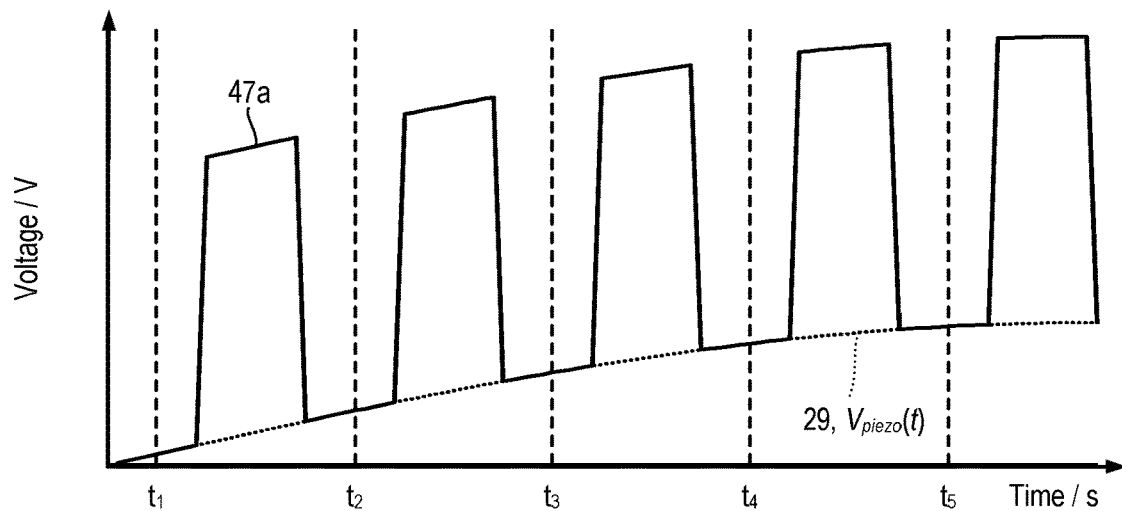
Figure 14C:
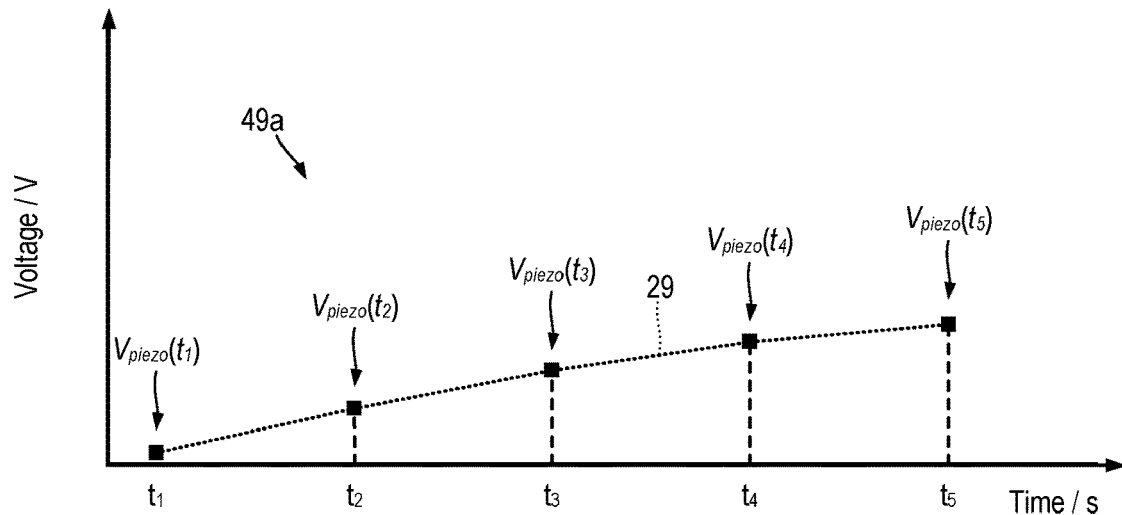

For example, referring also to FIGS. 14A to 14C, an example of obtaining a piezoelectric pressure signal 29 in the form of the first filtered signal 49a is illustrated.

For visual purposes, in FIGS. 14A to 14C, the driving signal 39, $V_{sig}(t)$ and a superposed piezoelectric pressure signal 29, $V_{piezo}(t)$ have been illustrated with much smaller disparities in frequency and amplitude than would be expected in practice. In practice, the driving signal 39, $V_{sig}(t)$ would be expected to have a significantly larger amplitude and to vary at a frequency several orders of magnitude larger than the piezoelectric pressure signal 29, $V_{piezo}(t)$.

Referring in particular to FIG. 14A, an example of a driving signal 39, $V_{sig}(t)$ of base frequency $f_d$ may take the form a pulsed wave with a 50:50 duty ratio and a period of $1/f_d$. In this example, the first synchronisation signal 48a triggers the first primary ADC 38a at approximately the midpoint of the driving signal 39, $V_{sig}(t)$ minimum, or zero, period. For example, the first primary ADC 38a may obtain a sample at times $t_1$, $t_2=t_1+1/f_d$, $t_3=t_1+2/f_d$ and so forth.

Referring in particular to FIG. 14B, with the first sensing electrodes 14 acting as transmitter electrodes, Tx, and the second sensing electrodes 20 acting as receiving electrodes, Rx, the amplified signal 47a may be approximated as a superposition of a piezoelectric pressure signal 29, $V_{piezo}(t)$ and the driving signal 39 $V_{sig}(t)$. The first synchronisation signal 48a triggers sampling of the amplified signal 47a at times when the contribution of the driving signal 39, $V_{sig}(t)$ to the amplified signal 47a is substantially equal to a ground, common mode or minimum value. In this way, a sampling of substantially only the piezoelectric pressure signal 29, $V_{piezo}(t)$ may be obtained.

Referring in particular to FIG. 14C, the first filtered signal 49a then takes the form of a sequence of samplings of the piezoelectric pressure signal 29, $V_{piezo}(t)$ at times $t_1$, $t_2$, $t_3$ and so forth.

The first secondary ADC 43a receives the amplified signal 47a corresponding to a presently addressed first sensing electrode 14 from the first multiplexer 42a output. The first secondary ADC 43a samples the amplified signal 47a at a sampling frequency $f_{cap}$, which is at least several times the base frequency $f_d$ of the driving signal 39, $V_{sig}(t)$. The first secondary ADC 43a outputs a digitised amplified signal 50a to the controller 25. The controller 25 receives the digitised amplified signal 50a and applies a digital high pass filter to obtain a second filtered signal in the digital domain. The second filtered signal corresponds to capacitance signals 27.

Alternatively, since the piezoelectric pressure signal 29, $V_{piezo}(t)$ typically varies at frequencies several orders of magnitude lower than the base frequency $f_d$ of the driving signal 39, $V_{sig}(t)$, the controller 25 may treat the most recently sampled value of the first filtered signal 49a, for example $V_{piezo}(t_3)$, as an additional offset and subtract this value from the digitised amplified signal 50a. More accurate baseline corrections may be employed, for example, linear interpolation based on the two most recent sampled values of the first filtered signal 49a, or quadratic interpolation based on the three most recently sampled values of the first filtered signal 49a.

The primary and secondary ADCs 38a, 43a may be the same. However, it may be advantageous for the primary and secondary ADCs 38a, 43a to be different. In particular, the primary ADC 38a may be optimised for the dynamic range of the piezoelectric pressure signals 29, $V_{piezo}(t)$, without the need to measure the larger amplitudes corresponding to the driving signal $V_{sig}(t)$. Furthermore, because the first sampling frequency $f_{piezo}$ should be at most equal to the base frequency $f_d$ of the capacitance measurement signal 39, $V_{sig}(t)$, a lower bandwidth is required for the primary ADC 38a compared to the secondary ADC 43a. For cost sensitive applications, this enables use of cheaper, ADCs for the primary ADC 38a. By contrast, for performance applications, this enables the use of more precise ADCs capable of differentiating a larger number of signal levels within the same dynamic range (a 16-bit ADC is typically slower than an 8-bit ADC all else being equal).

The processing of signals from the second sensing electrodes 20 is similar to that of signals from the first sensing electrodes 14, except that because the second sensing electrodes 20 are the receiving, Rx electrodes, a second synchronisation signal 48b for the second primary ADC 38b may be offset with respect to the first synchronisation signal 48a.

Each charge amplifier 34 of the second amplifier module 41b is connected to a corresponding second sensing electrode 20 via a conductive trace 26, and the output of each charge amplifier 34 of the second amplifier module 41b is connected to a corresponding input of the second multiplexer 42b. In this way, the second multiplexer 42b may output an amplified signal 47b corresponding to an addressed second sensing electrode 20.

The amplified signal 47b corresponding to a presently addressed second sensing electrode 20 includes a superposition of a received capacitance measurement signal (not shown) $V_{meas}(t)$ and a piezoelectric pressure signal 29, $V_{piezo}(t)$. The received capacitance measurement signal $V_{meas}(t)$ (referred to as a "received signal" for brevity hereinafter) is the driving signal 39, $V_{sig}(t)$ as coupled to the addressed second sensing electrode 20 by a mutual capacitance between the addressed second sensing electrode 20 and a first sensing electrode 14. The received signal $V_{meas}(t)$ is related to and has a similar form to the driving signal 39, $V_{sig}(t)$, and in particular has substantially the same frequency contents. However, the received signal $V_{meas}(t)$ may include a change in amplitude and/or a change in phase compared to the driving signal $V_{sig}(t)$. The second primary ADC 38b receives a second synchronisation signal 48b from the controller 25 (also referred to as a "clock signal"). The second synchronisation signal 48b triggers the second primary ADC 38b to obtain samples at the sampling frequency $f_{piezo}$ and at times corresponding to the amplitude of the received signal $V_{meas}(t)$ being substantially equal to a ground, common mode or minimum value. Depending on the form of the driving signal 39, $V_{sig}(t)$ and the typical phase shifts between driving signals 39, $V_{sig}(t)$ and the received signals $V_{meas}(t)$, there are several possible relationships between the first and second synchronisation signals 48a, 48b.

When the received signal $V_{meas}(t)$ is approximately in phase with the driving signal 39, $V_{sig}(t)$, the second synchronisation signal 48b may be the same as the first synchronisation signal 48a. The second synchronisation signal 48b will trigger sampling of the amplified signal 47b at times when the contribution of the received signal $V_{meas}(t)$ to the amplified signal 47b is substantially equal to a ground, common mode or minimum value. In this way, a sampling of substantially only the piezoelectric pressure signal 29, $V_{piezo}(t)$ may be obtained.

Similarly, for a driving signal 39, $V_{sig}(t)$ in the form of a pulsed wave as shown in FIG. 14A, small phase shifts φ of up to about φ±π/2 between the received signal $V_{meas}(t)$ and the driving signal 39, $V_{sig}(t)$ may be accommodated without requiring any offset between the first and second synchronisation signals 48a, 48b. For a pulsed wave, such phase shifts can be tolerated because the driving signal 39, $V_{sig}(t)$ and received signal $V_{meas}(t)$ are each substantially equal to zero for half of each period.

For larger phase shifts φ or different, non-square, waveforms of the driving signal 39, $V_{sig}(t)$, the second synchronisation signal 48b may be offset with respect to the first synchronisation signal 48a such that, within the range of capacitances expected/measured for the corresponding touch panel 10, the second synchronisation signal 48b triggers the second primary ADC 38b during a period of low or zero signal level of the received signal $V_{meas}(t)$. In other words, the second synchronisation signal 48b may synchronise the sampling of the second primary ADC 38b to the received signal $V_{meas}(t)$, instead of the driving signal 39, $V_{sig}(t)$.

Alternatively, the second synchronisation signal 48b could be generated in response to a condition on the received signal $V_{meas}(t)$. For example, a simple comparator circuit could be used to generated the second synchronisation signal 48b in response to the received signal $V_{meas}(t)$ dropping to within a pre-calibrated range of ground, common mode or a minimum value. A circuit triggering the second synchronisation signal 48b may include a delay timer.

In this way, the second primary ADC 38b may obtain a second filtered signal 49b in the form of a sampled signal which corresponds approximately to a piezoelectric pressure signal 29, $V_{piezo}(t)$ generated by the second sensing electrode 20 connected via the second multiplexer 42b. The second synchronisation signal 48b need not trigger the second primary ADC 38b to obtain samples during every single period of the driving signal 39, $V_{sig}(t)$ or measured signal $V_{meas}(t)$, and instead may trigger the second primary ADC 38b to obtain samples during, for example, every other period, every tenth period, every hundredth period and so forth.

The controller 25 may also provide a second synchronisation signal 51 to the multiplexers 42a, 42b and/or amplifiers 34. The second synchronisation signal 51 may cause the multiplexers 42a, 42b to address each combination of first and second sensing electrodes 14, 20 according to a sequence determined by the controller 25. In this way, the touch controller 25 may receive amplified signals 47a, 47b from each pairing of first and second sensing electrodes 14, 20 according to a sequence determined by the controller 25. The sequence may be pre-defined, for example, the sequence may select each pair of a first sensing electrode 14 and a second sensing electrode 20 once before repeating. The sequence may be dynamically determined, for example, when one or more user interactions are detected, the controller 25 may scan the subset of first and second sensing electrodes 14, 20 adjacent to each detected user interaction in order to provide faster and/or more accurate tracking of user touches.

The common electrode charge amplifier 44 receives signals from the common electrode 15 and generates a common electrode amplified signal 52. The common electrode ADC 45 receives the common electrode amplified signal 52 and samples it at the piezoelectric sampling frequency $f_{piezo}$ to generate the second piezoelectric signal 30. Optionally, the common electrode ADC 45 is also synchronised by a third synchronisation signal 48c, which may be identical to or offset from the first synchronisation signal, so as to sample the second piezoelectric signal 30 at times corresponding to ground, common mode or a minimum value of the driving signal 39, $V_{sig}(t)$ and/or ground, common mode or a minimum value the received signal $V_{meas}(t)$. Synchronisation of the common electrode ADC 45 may help to reduce or avoid cross-talk from the capacitance measurements.

Based on the obtained filtered signals 49a, 49b the controller 25 may calculate pressure values 32a, 32b corresponding to the addressed first and second sensing electrodes 14, 20. The pressure values 32a, 32b are determined based on the first and second piezoelectric pressure signals 29, 30, using the first and/or second methods described hereinbefore. The pressure values 32a, 32b may be output via the link 46.

As mentioned hereinbefore, the controller 25 provides the driving signal 39, $V_{sig}(t)$ to each amplifier 34 of the first amplifier module 41a. An input of each amplifier 34 of the first amplification module 41a may be used to drive the corresponding first sensing electrode 14 of the first touch panel 10 using the driving signal 39, $V_{sig}(t)$. Based on the driving signal 39, $V_{sig}(t)$ and the first and second digitised amplified signals 50a, 50b obtained by the controller 25, the controller 25 calculates capacitance values 27 and/or touch data 31 based on the mutual-capacitance between the addressed first and second sensing electrodes 14, 20. The capacitance values 27 and/or touch data 31 may be output via the link 46.

Figure 15:
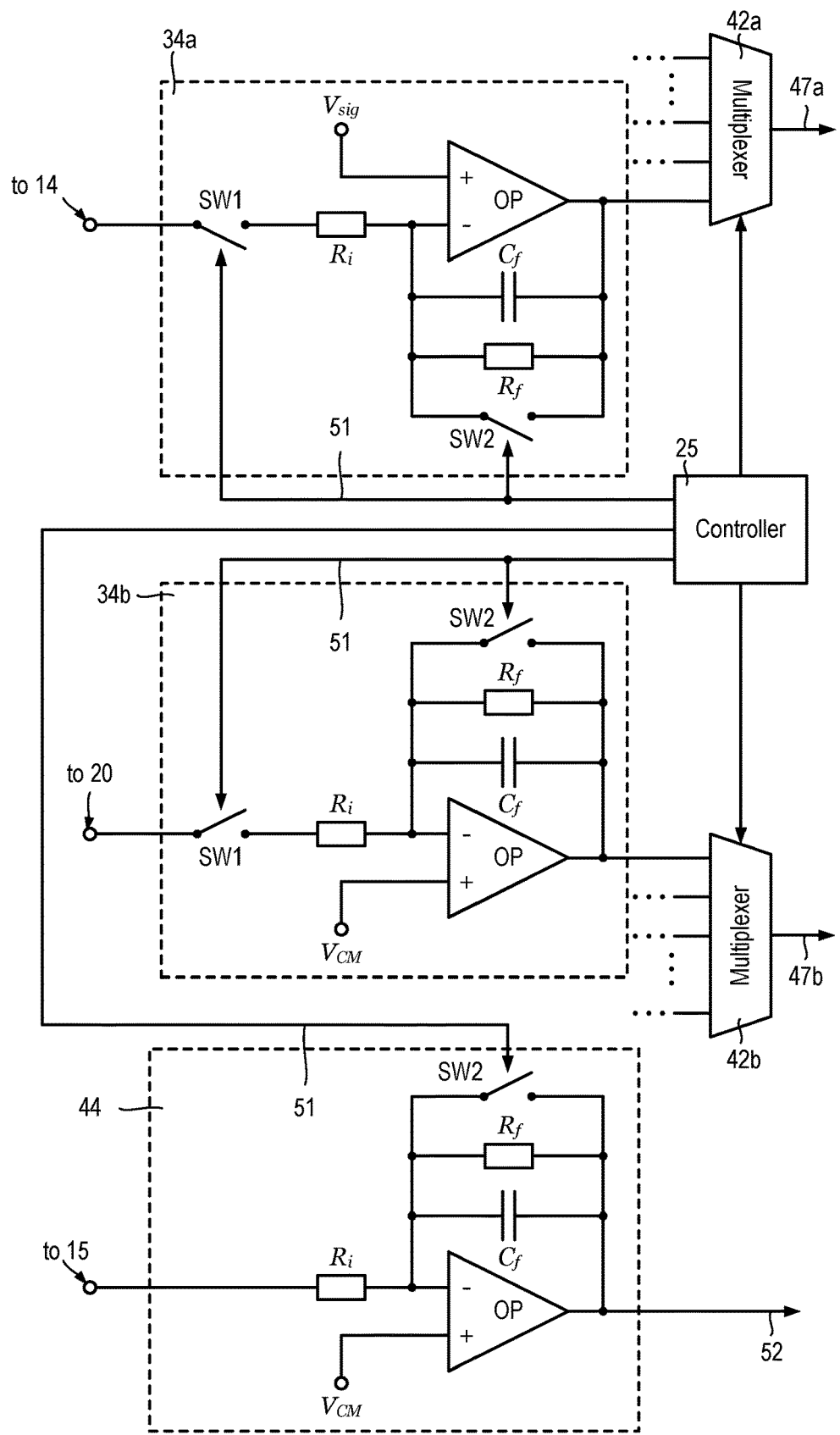
FIG. 15 illustrates an exemplary configuration of charge amplifiers for differential piezoelectric pressure measurements.

Referring also to FIG. 15, an example of one configuration of charge amplifiers 34a, 34b, 44 suitable for use in the second apparatus is shown.

In one configuration, each charge amplifier 34a, 34b, 44 includes an operational amplifier OP having an inverting input, a non-inverting input and an output.

For example, each charge amplifier 34a forming part of the first amplifier module 41a includes an operational amplifier OP having an inverting input for coupling to a corresponding first sensing electrode 14 via an input resistance $R_i$ and a first switch SW1 connected in series. The non-inverting input of the operational amplifier OP is connected to the driving signal 39, $V_{sig}(t)$. The driving signal 39, $V_{sig}(t)$ may be provided by the controller 25, by a separate module (not shown) of the second apparatus 37 or may be received into the second apparatus 37 from an external source. Since the inverting input will be at practically the same voltage as the non-inverting input, the inverting input can be caused to drive the corresponding first sensing electrode 14. A feedback network of the charge amplifier 34a includes a feedback resistance $R_f$, a feedback capacitance $C_f$ and a second switch SW2 connected in parallel between the inverting input and the output of the operational amplifier OP. The output of the operational amplifier OP provides the amplified signal 47a.

Each charge amplifier 34b forming part of the second amplifier module 41b is the same as each charge amplifier 34a of the first amplifier module 41a, except that the non-inverting input of the operational amplifier OP is coupled to a common mode voltage $V_{CM}$ instead of the driving signal 39, $V_{sig}(t)$, and in that the inverting input is connected to a second sensing electrode 20 instead of a first sensing electrode 14.

The common electrode charge amplifier 44 is the same as the charge amplifiers 34b forming part of the second amplifier module 41b, except that the inverting input of the common electrode charge amplifier 44 is connected to the common electrode 15 and the common electrode charge amplifier 44 omits the first switch SW1.

Other terminals of the operational amplifiers OP, such as power supply terminals, may be present, but are not shown in this or other schematic circuit diagrams described herein.

The second switches SW2 permit the corresponding feedback capacitors $C_f$ to be discharged. The opening and closing of the second switches SW2 may be governed by the second synchronisation signal 51 provided by the controller 25. In this way, the feedback capacitors $C_f$ of each charge amplifier 34a, 34b may be periodically discharged in order to reset the feedback network of the operational amplifier OP to prevent excessive drift. Optionally, the second switch SW2 of the common electrode charge amplifier 44 may also be synchronised using the second synchronisation signal 51.

The first switches SW1 may be controlled by the second synchronisation signal 51 provided by the controller 25 to enable an amplifier 34a, 34b to be connected or disconnected from the corresponding sensing electrode 14, 20 if required.

The first sensing electrodes 14 need not be transmitting, Tx electrodes and the second sensing electrodes 20 receiving, Rx electrodes. Alternatively, the controller 25 may provide the driving signal 39, $V_{sig}(t)$ to the second amplifier module 41b so that the second sensing electrodes 20 are transmitting, Tx electrodes and the received signals $V_{meas}(t)$ are detected using the first sensing electrodes 14.

In other examples, the second apparatus 37 need not be configured for mutual capacitance measurements, and may instead be configured to measure self-capacitances of each first and second sensing electrode 14, 20. In this case, a self-capacitance measurement signal (not shown) may be provided to both the first and second amplifier modules 41a, 41b.

Second Touch Panel

In the first touch panel 10, the first and second sensing electrodes 14, 20 have been shown in the form of elongated rectangular electrodes. However, other shapes may be used.

Figure 16:
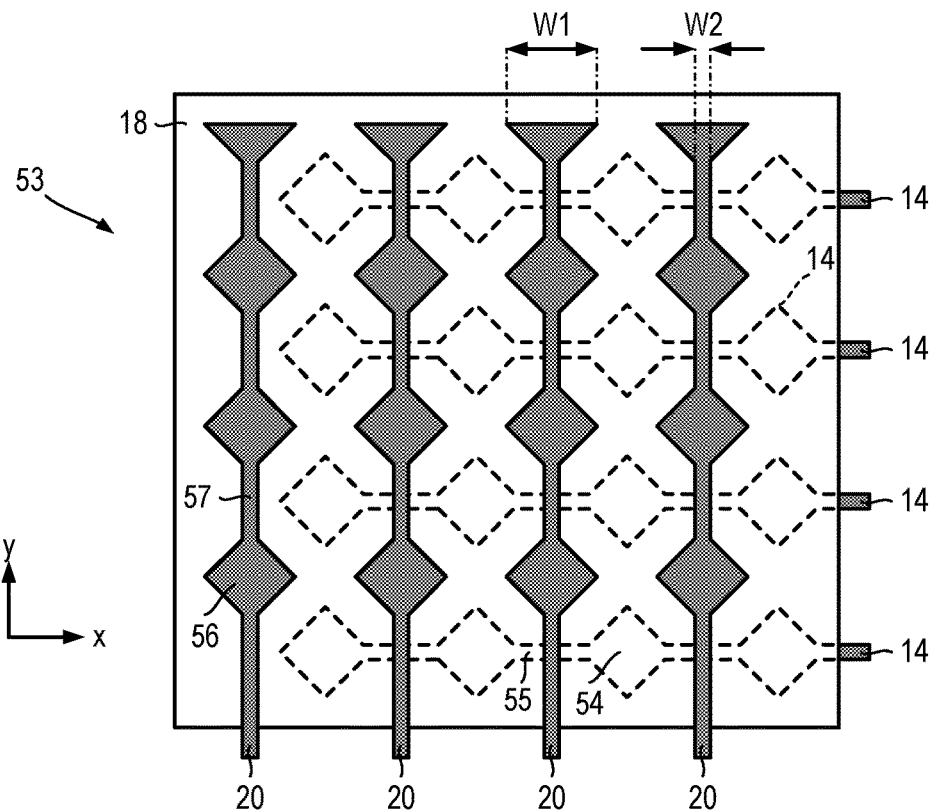
FIG. 16 is a plan view of a second touch panel for piezoelectric pressure measurements.

Referring also to FIG. 16, a second touch panel 53 having an alternative geometry of the first and second sensing electrodes 14, 20 is shown.

Instead of being rectangular, each first sensing electrode 14 may include several pad segments 54 evenly spaced in the first direction x and connected to one another in the first direction x by relatively narrow bridging segments 55. Similarly each second sensing electrode 20 may comprise several pad segments 56 evenly spaced in the second direction y and connected to one another in the second direction y by relatively narrow bridging segments 57. The pad segments 54 of the first sensing electrodes 14 are diamonds having a first width W1 in the second direction y and the bridging segments 55 of the first sensing electrodes 14 have a second width W2 in the second direction y. The pad segments 56 and bridging segments 57 of the second sensing electrodes 20 have the same respective shapes and widths W1, W2 as the first sensing electrodes 14.

The first and second sensing electrodes 14, 20 are arranged such that the bridging segments 57 of the second sensing electrodes 20 overlie the bridging segments 55 of the first sensing electrodes 14. Alternatively, the first and second sensing electrodes 14, 20 may be arranged such that the pad segments 56 of the second sensing electrodes 20 overlie the pad segments 54 of the first sensing electrodes 14. The pad segments 54, 56 need not be diamond shaped, and may instead be circular. The pad segments 54, 56 may be a regular polygon such as a triangle, square, pentagon or hexagon. The pad segments 54, 56 may be I shaped or Z shaped.

The alternative geometry of the second touch panel 53 is equally applicable in combination with the first or second apparatus 22, 37.

Third Touch Panel

Referring also FIG. 17, a third touch panel 58 may be used in combination with the first or second apparatus 22, 37.

The third touch panel 58 is substantially the same as the first touch panel lo except that the third touch panel 58 does not include the second layer structure 17 and the second sensing electrodes 20 are disposed on the first face 12 of the first layer structure 11 in addition to the first sensing electrodes 14. Each first sensing electrode 14 is a continuous conductive region extending in the first direction x. For example, each first sensing electrode 14 may include several pad segments 59 evenly spaced in the first direction x and connected to one another in the first direction x by relatively narrow bridging segments 60. Each second sensing electrode 20 may comprise several pad segments 61 evenly spaced in the second direction y. However, the pad segments 6i of the second sensing electrodes 20 are disposed on the first face 12 of the first layer structure ii and are interspersed with, and separated by, the first sensing electrodes 14. The pad segments 61 corresponding to each second sensing electrode 20 are connected together by conductive jumpers 62. The jumpers 62 each span a part of a first sensing electrode 14 and the jumpers 62 are insulated from the first sensing electrodes 14 by a thin layer of dielectric material (not shown) which may be localised to the area around the intersection of the jumper 62 and the first sensing electrode 14.

Alternatively, a thin dielectric layer (not shown) may overlie the first face 12 of the first layer structure 11, the first sensing electrodes 14 and the conductive pads 61 of the second sensing electrodes 20. Conductive traces (not shown) extending in the second direction y may be disposed over the dielectric layer (not shown), each conductive trace (not shown) overlying the pad segments 6i making up one second sensing electrode 20. The overlying conductive traces (not shown) may connect the pad segments 61 making up each second sensing electrode 20 using vias (not shown) formed through the thin dielectric layer (not shown).

Modifications

It will be appreciated that many modifications may be made to the embodiments hereinbefore described. Such modifications may involve equivalent and other features which are already known in the design, manufacture and use of pressure and/or projected capacitance sensing touch panels and which may be used instead of or in addition to features already described herein. Features of one embodiment may be replaced or supplemented by features of another embodiment.

Third Apparatus

Figure 18:
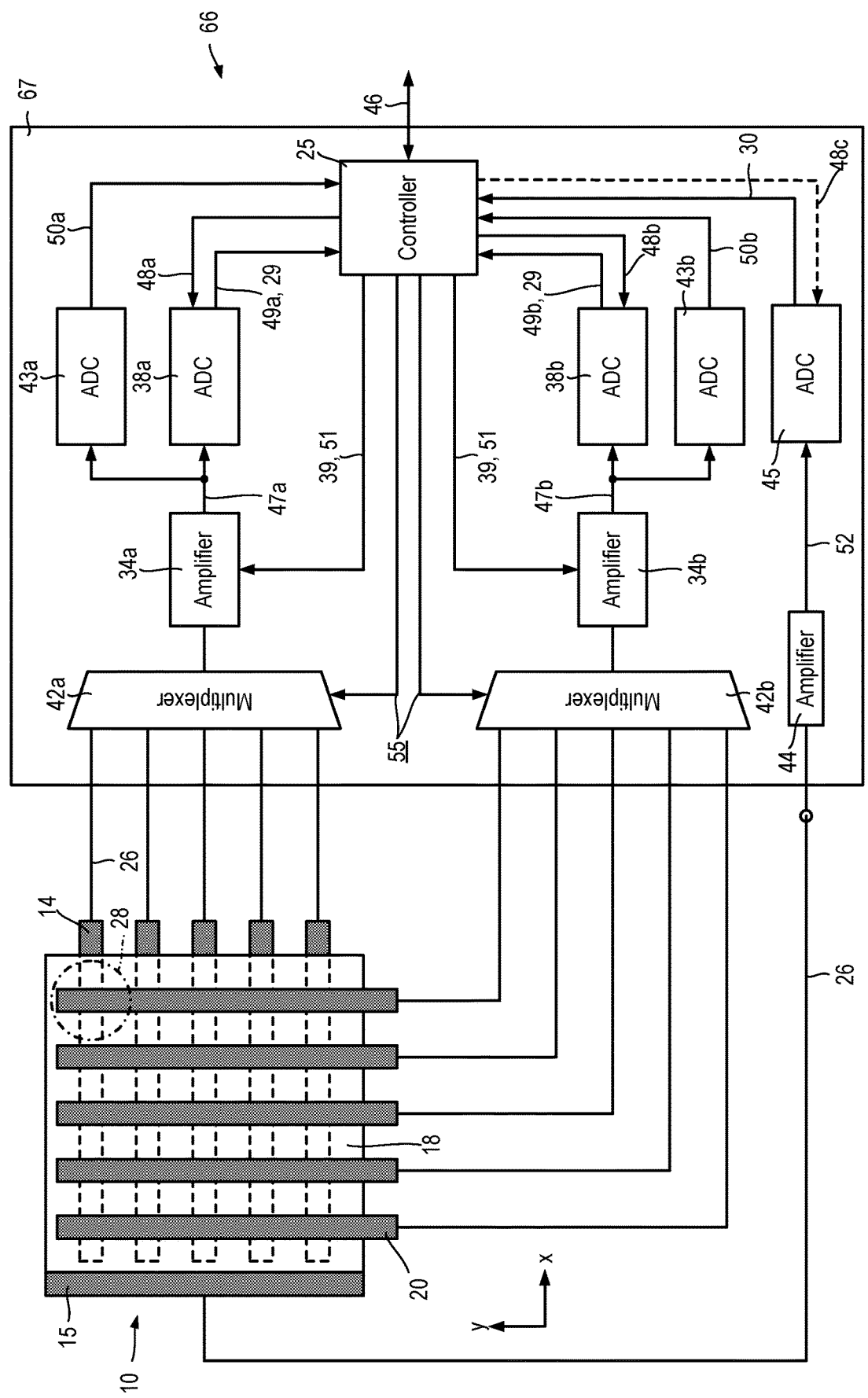
FIG. 18 illustrates a third apparatus for differential piezoelectric pressure measurements.

Referring also to FIG. 18, a third apparatus 66 includes the first touch panel 10 and a second controller 67 for combined pressure and capacitance sensing.

The second controller 67 is the same as the first controller 40, except that in the second controller 67 the input signals from a first sensing electrode 14 are connected to a single charge amplifier 34a by a first multiplexer 42a. The charge amplifier 34a outputs the first amplified signal 47a, which is processed by the first primary ADC 38a, the first secondary ADC 43a and the controller 25 in the same way as for the first controller 40. Similarly, the input signals from a second sensing electrode 20 are connected to a single charge amplifier 34b by a second multiplexer 42b. The charge amplifier 34b outputs the second amplified signal 47b, which is processed by the second primary ADC 38b, the second secondary ADC 43b and the controller 25 in the same way as for the first controller 40. The acquisition and processing of signals from the common electrode 15 is the same as for the second apparatus 37.

In the same way as the first controller 40, use of primary and secondary ADCs 38, 43 is not essential. Instead, a single ADC (not shown) which is capable of alternating operation at the piezoelectric and capacitive sampling frequencies $f_{piezo}$, $f_{cap}$, so as to obtain the signals 49, 50 sequentially.

Fourth Apparatus

Figure 19:
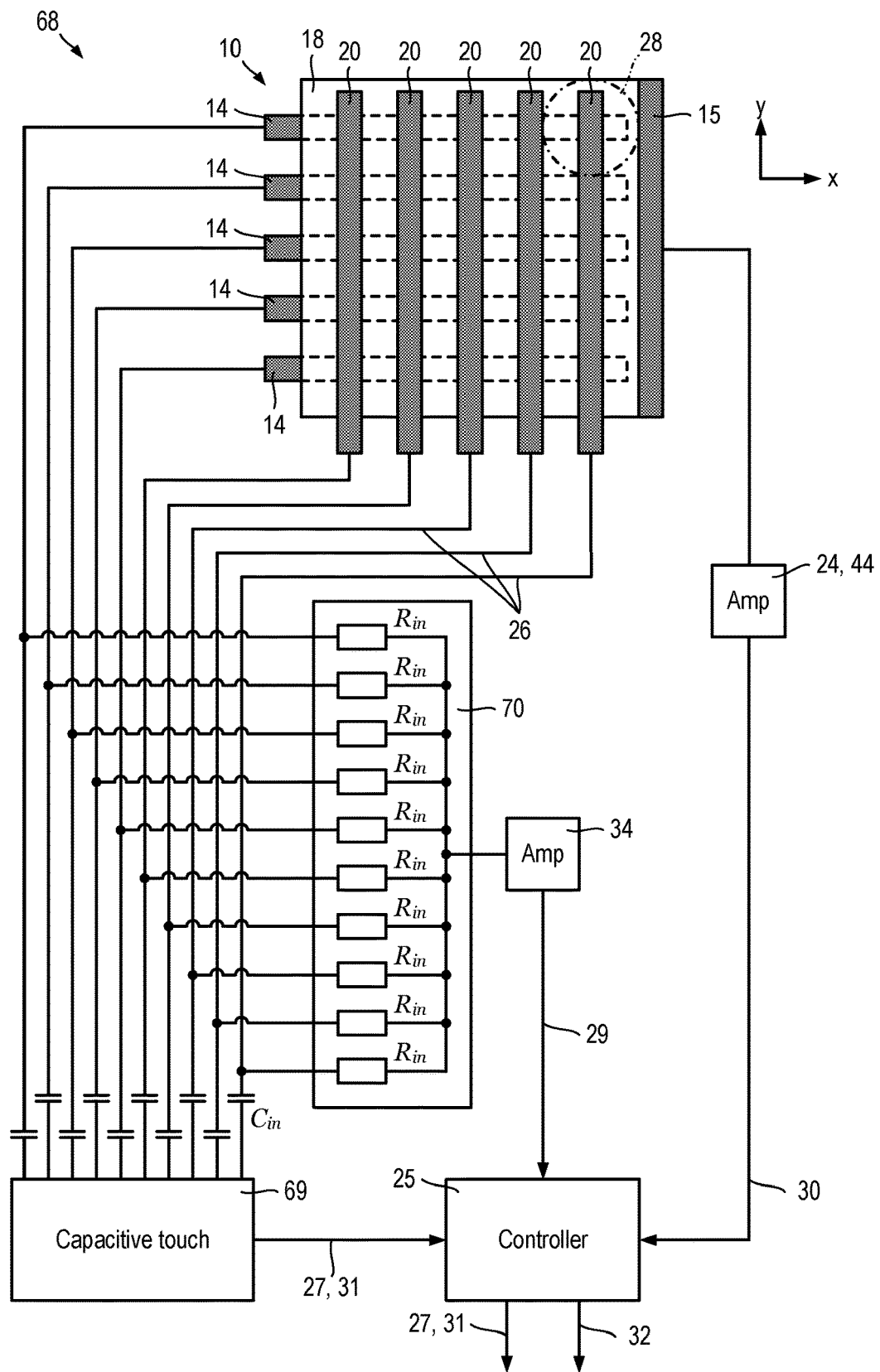
FIG. 19 illustrates a fourth apparatus for differential piezoelectric pressure measurements.

Referring also to FIG. 19, a fourth apparatus 68 for combined pressure and capacitance sensing is shown.

The fourth apparatus 68 includes the first touch panel 10 and a measurement circuit including a first circuit 23 in the form of a capacitive touch controller 69, an impedance network 70 and a charge amplifier 34, a second circuit 24 in the form of a common electrode charge amplifier 44, and a controller 25.

The capacitive touch controller 69 may be a standard, commercially available device configured for either self-capacitance measurements of the individual first and second sensing electrodes 14, 20, for mutual capacitance measurements between pairings of first and second sensing electrodes 14, 20, or both. Suitable devices for providing the capacitive touch controller include, without being limited to, a Solomon Systech maXTouch® controller, a Cypress Semiconductor CapSense® controller, a Synaptics ClearPad® controller, or other devices with comparable functionality. Each measurement terminal of the capacitive touch controller 69 is coupled to a corresponding first or second sensing electrode 14, 20 via an input capacitance $C_{in}$ and a conductive trace 26. The input capacitances $C_{in}$ may typically have a value ranging between about 100 pF and about 1 nF. The capacitive touch controller 69 may operate in any standard way to obtain capacitance values 27 which are passed to the controller 25.

Instead of measuring a first signal 29 corresponding to each sensing electrode 14, 20 or groups of adjacent sensing electrodes 14, 20, in the fourth apparatus 68 the impedance network 70 couples all of the sensing electrodes 14, 20 to an input of a single charge amplifier 34. In other words, in the fourth apparatus 68, the summation to obtain $Q_{sen}$ according to Equation (11) (or $V_{sen}$ according to Equation(17)) is moved from the digital domain into the analogue domain. Each sensing electrode 14, 20 is coupled to the input of the charge amplifier 34 by an input resistance $R_{in}$. The input resistances $R_{in}$ are sufficiently large to suppress cross-talk between measurement channels of the capacitive touch controller 69. Input resistances $R_{in}$ may typically have a value ranging between about 10 kΩ and about 100 kΩ.

The controller 25 receives the first piezoelectric signal 29 and the second piezoelectric signal 30. The controller 25 may estimate the corrected piezoelectric signal 32 based on the total piezoelectric charge $F_{CE}$ using, for example, Equation (13) or Equation (21). The total piezoelectric charge $F_{CE}$ provides an estimate of the total applied pressure. The controller 25 uses the capacitance values 27 to determine touch location data 31. Alternatively, if the capacitive touch controller 69 provides suitable functionality, the capacitive touch controller 69 may determine touch location data 31 internally, and may output the touch location data 31 to the controller 25. The controller 25 may use the touch location data 31 from the capacitive touch controller 69 to look-up position dependent coefficients for the weighted difference calculation of the total piezoelectric charge $F_{CE}$.

In this way, the fourth apparatus 68 may be used to provide an estimate of total applied pressure concurrently with standard capacitance measurements obtained using a conventional capacitive touch controller 69. This may allow a conventional capacitive touch system to be augmented with an estimate of global applied force with the addition of the piezoelectric layer 16, the common electrode 15, the impedance network 70, and a pair of charge amplifiers 34, 44.

In a modification of the fourth apparatus 68, the input capacitances $C_{in}$ may be replaced with an array of switches (not shown) which may be used to disconnect the sensing electrodes 14, 20 from the capacitive touch controller 69. In such a modification, the measurements of capacitance values 27 and piezoelectric signals 29, 30 are not concurrent and are instead time multiplexed. For example, in a first, capacitance measurement period the sensing electrodes 14, 20 may be connected to the capacitive touch controller 69 to obtain capacitance values 27, whilst in a second, pressure measurement period the sensing electrodes 14, 20 may be disconnected from the capacitive touch controller 69 whilst the first and second piezoelectric signals 29, 30 are obtained. During the capacitance measurement period, switches may be used to short feedback networks of the charge amplifiers 34, 44 (SW2 in FIG. 15, SW6 in FIG. 26). The capacitance measurement period and the pressure measurement period repeat in a loop.

Although illustrated with reference to the first touch panel 10, the fourth apparatus 68 may alternatively use the second touch panel 53, the third touch panel 58, or any other suitable touch panel which includes a piezoelectric layer 16 arranged between one or more common electrodes 15 and a number of sensing electrodes 14, 20.

Fifth Apparatus

Examples have been described in which a differential measurement is obtained between the common electrode 15 and the sensing electrodes 14, 20 in order to reduce the influence of coupling to external electrical fields on a piezoelectric pressure measurement. In other words, the first to fourth apparatuses 22, 37, 66, 68 have involved using the sensing electrodes to perform differential measurements, thereby reducing any contributions to an estimate of the total pressure which result from coupling to external electric fields. However, the sensing electrodes of the touch panel 10, 53, 58 may also be utilised in other ways in order to reduce unwanted contributions from coupling to external electrical fields, for example, when performing a non-differential piezoelectric pressure measurement.

Figure 20:
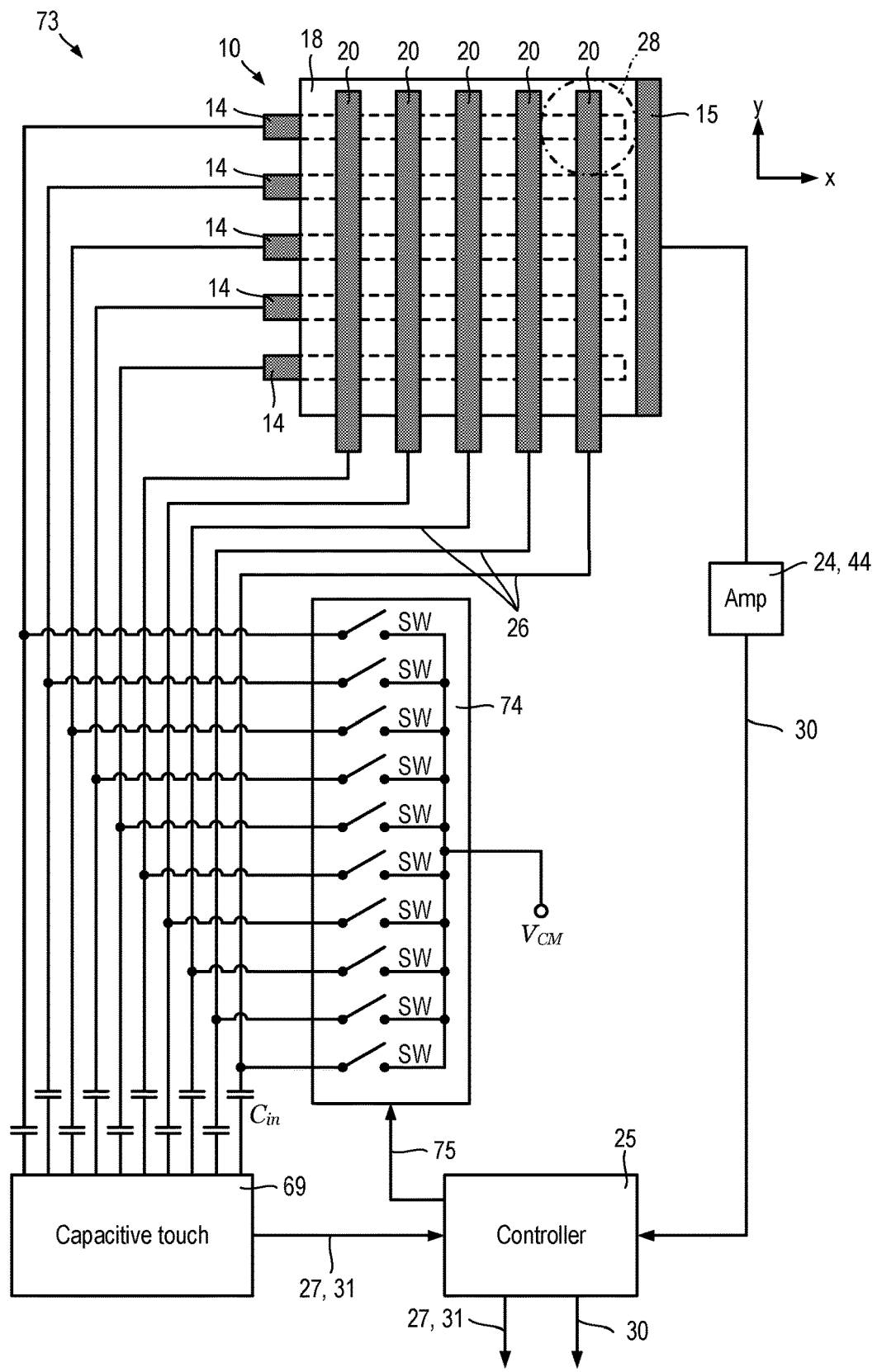
FIG. 20 illustrates a fifth apparatus for piezoelectric pressure measurements.

Referring also to FIG. 20, a fifth apparatus 73 for combined pressure and capacitance sensing is shown.

The fifth apparatus 73 includes the first touch panel 10 and a measurement circuit including a first circuit 23 in the form of a capacitive touch controller 69 and a switch network 74, a second circuit 24 in the form of a common electrode charge amplifier 44, and a controller 25.

The fifth apparatus 73 is used for time multiplexed capacitance and pressure measurements. During a first, capacitance measurement period, the switches SW of the switch network 74 are open, isolating each of the sensing electrodes 14, 20 whilst the capacitive touch controller 69 performs conventional measurements of capacitance values 27. The operation of the switches SW of the switch network 74 is controlled by the control signals 75 provided by the controller 25. The capacitance values 27 are passed to the controller 25, which may determine touch location data 31 based on the capacitance values 27. In some embodiments the capacitive touch controller 69 may determine and output the touch location data 31 to the controller 25, or directly to a processor (not shown) of an electronic device (not shown) which incorporates the fifth apparatus 73. During the capacitance measurement period, a switch (not shown) may be used to short a feedback network of the charge amplifier 44 (similar to SW2 in FIG. 15 or SW6 in FIG. 25).

During a second, pressure measurement period, the switches SW of the switch network 74 are closed, connecting the sensing electrodes 14, 20 to system ground or a common mode voltage $V_{CM}$. In this way, the sensing electrodes 14, 20 may be used to electrostatically shield the common electrode 15 against coupling to external electric fields. The common electrode 15 and the charge amplifier 44 are used during the pressure measurement period to obtain the second piezoelectric signal 30. The controller 25 may output the second piezoelectric signal 30 as an estimate of the total pressure applied to the touch panel 10. Using the sensing electrodes 14, 20 to electrostatically shield the common electrode 15 may permit total pressure measurements which are relatively more robust against interference from external electric fields. Time multiplexing allows retention of the location sensing using conventional capacitance based methods.

The fifth apparatus 73 may permit an existing, conventional capacitive touch panel to be augmented with pressure/force sensing with minimal added complexity.

In a modification of the fifth apparatus 73, the input capacitances $C_{in}$ may be replaced with an array of switches (not shown) or a second switch network (not shown) which may be used to disconnect the sensing electrodes 14, 20 from the capacitive touch controller 69 during the pressure measurement period.

Although illustrated with reference to the first touch panel 10, the fifth apparatus 73 may alternatively use the second touch panel 53, the third touch panel 58, or any other suitable touch panel which includes a piezoelectric layer 16 arranged between one or more common electrodes 15 and a number of sensing electrodes 14, 20.

Sixth Apparatus

Figure 21:
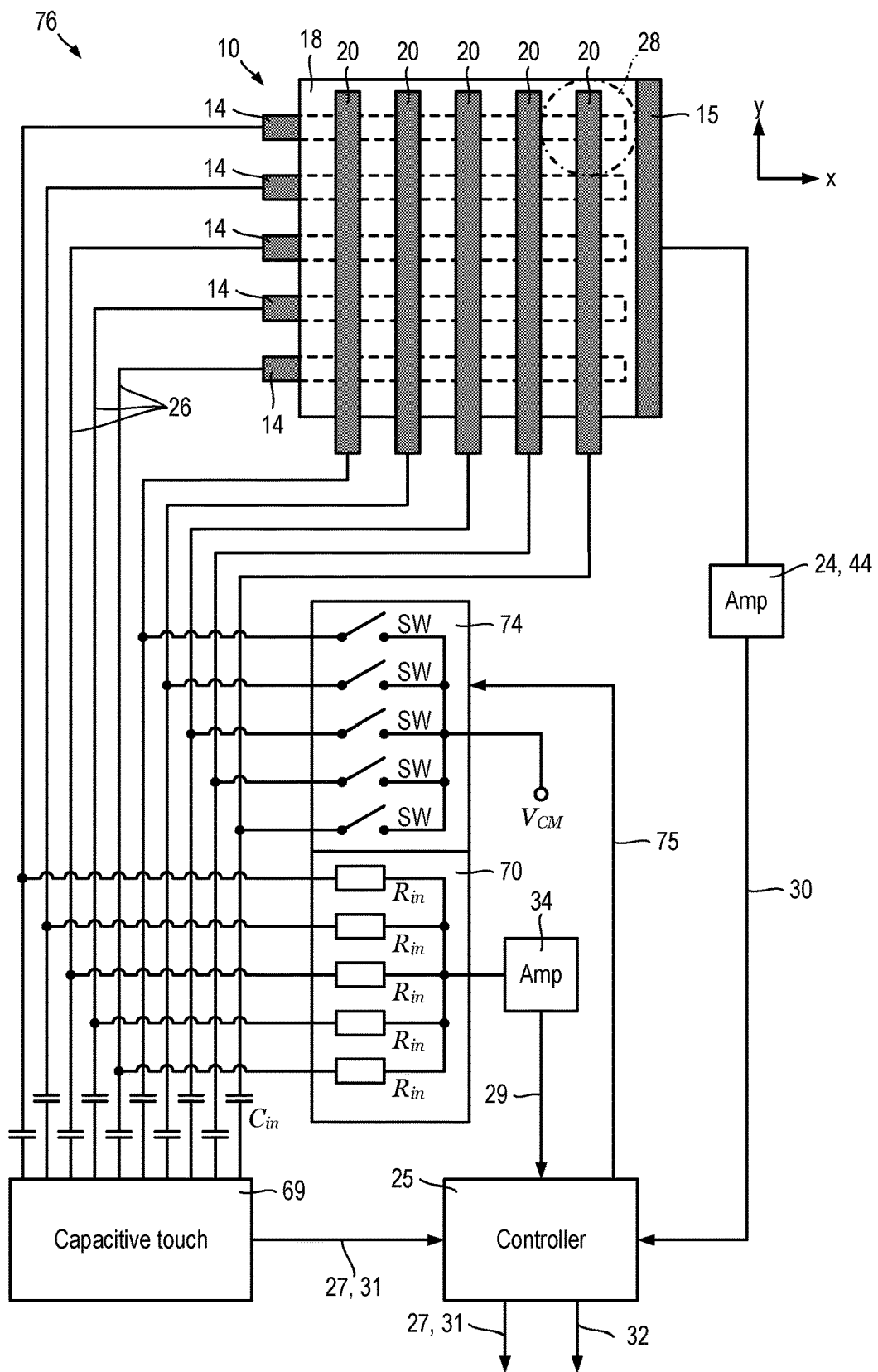
FIG. 21 illustrates a sixth apparatus for differential piezoelectric pressure measurements.

Referring also to FIG. 21, a sixth apparatus 76 for combined pressure and capacitance sensing is shown.

The sixth apparatus 76 is similar to the fourth apparatus 68, except that only the first sensing electrodes 14 are connected to the impedance network 70 of the measurement circuit, and the second sensing electrodes 20 are instead coupled to a switch network 74 in the same way as for the fifth apparatus 73.

In operation, the sixth apparatus 76 time multiplexes measurements of capacitance values 27 and measurements of the corrected piezoelectric signal 32. During a first, capacitance measurement period, the switches SW of the switch network 74 are caused to be open by control signal 75. The capacitive touch controller 69 is used to perform conventional self- or mutual-capacitance measurements to obtain capacitance values 27. In some examples the capacitance values 27 may be provided to the controller 25 which then determines touch location data 31. In other examples, the capacitive touch controller 69 may determine touch location data 31 internally and output the touch location data 31 to the controller 25 or to a processor (not shown) of an electronic device (not shown) which incorporates the sixth apparatus 76.

During the first time period, switches may be used to short feedback networks of the charge amplifiers 34, 44 (similar to SW2 in FIG. 15 or SW6 in FIG. 25) in order to avoid accumulating charges induced by the capacitance measurements.

During a second, pressure measurement period, the switches SW of the switch network 74 are caused to be closed by control signal 75, connecting each of the second sensing electrodes 20 to system ground or a common mode voltage $C_{VM}$. In this way, the second sensing electrodes 20 may be used to electrostatically shield the first sensing electrodes 14 and the common electrode 15 whilst first and second piezoelectric signals 29, 30 are obtained. The controller 25 calculates an estimate of the total applied pressure in the form of corrected piezoelectric signals 32. Using the second sensing electrodes 20 as an electrostatic shield may further reduce any influence of coupling to external electric fields in the corrected piezoelectric signal 32.

In the sixth apparatus 76, charges induced in the second sensing electrodes 20 by an external electric field or by the polarisation of the piezoelectric layer 16 will not be registered. However, such effects would be expected to be geometry dependent and repeatable, and therefore capable of being accounted for during calibration (for example using known forces at known locations) of the weightings used for obtaining the difference of the first and second piezoelectric signals 29, 30. The controller 25 may look-up appropriate weightings based on the determined or received touch location data 31.

In a modification of the sixth apparatus 76, the input capacitances $C_{in}$ may be replaced with an array of switches (not shown) or a second switch network (not shown) which may be used to disconnect the second sensing electrodes 20 from the capacitive touch controller 69 during the pressure measurement period.

In another modification of the sixth apparatus 76, obtaining a weighted difference of first and second piezoelectric signals 29, 30 may be moved out of the digital domain (i.e. controller 25), and instead performed in the analogue domain using a differential voltage amplifier (not shown).

Although illustrated with reference to the first touch panel 10, the sixth apparatus 76 may alternatively use the second touch panel 53, the third touch panel 58, or any other suitable touch panel which includes a piezoelectric layer 16 arranged between one or more common electrodes 15 and a number of sensing electrodes 14, 20.

Seventh Apparatus

Figure 22:
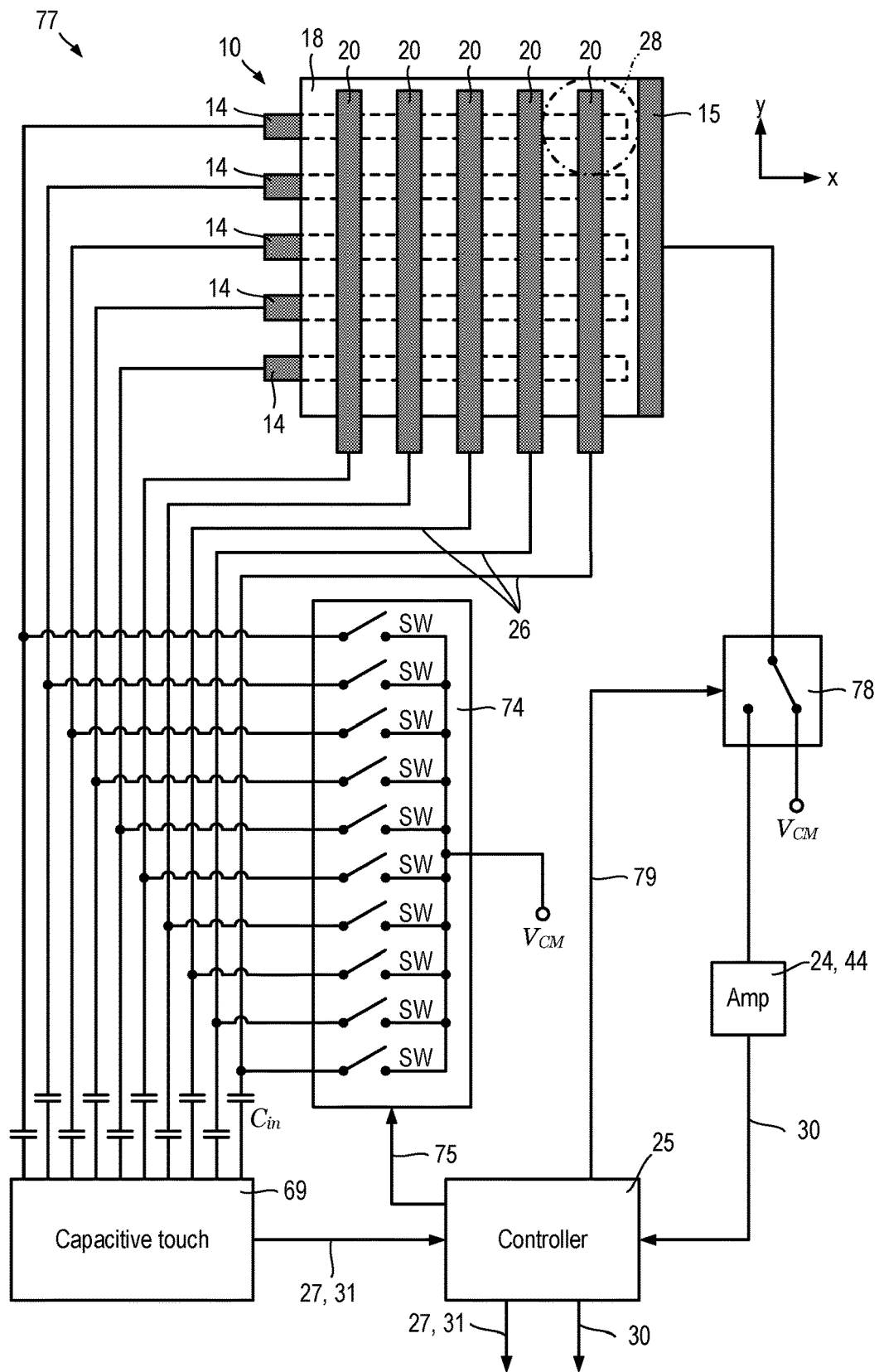
FIG. 22 illustrates a seventh apparatus for piezoelectric pressure measurements.

Referring also to FIG. 22, a seventh apparatus 77 for combined pressure and capacitance sensing is shown.

The seventh apparatus 77 is the same as the fifth apparatus 73, except that the measurement circuit is further configured so that the common electrode 15 is switchable using a common electrode switch 78 between the common mode charge amplifier 44 and system ground or common mode voltage $V_{CM}$. The common electrode switch 78 is controlled using control signals 79 provided by the controller 25.

In operation, the seventh apparatus 7 operates in the same way as the fifth apparatus 73, except that during the first, capacitance measurement period the common electrode 15 is connected to system ground or common mode voltage $V_{CM}$. During the second, pressure measurement period the common electrode switch 78 connects the common electrode 15 to the charge amplifier 44 for measurement of the second piezoelectric signal 30.

In a modification of the seventh apparatus 77, the input capacitances $C_{in}$ may be replaced with an array of switches (not shown) or a second switch network (not shown) which may be used to disconnect the sensing electrodes 14, 20 from the capacitive touch controller 69 during the pressure measurement period.

Although illustrated with reference to the first touch panel 10, the seventh apparatus 77 may alternatively use the second touch panel 53, the third touch panel 58, or any other suitable touch panel which includes a piezoelectric layer 16 arranged between one or more common electrodes 15 and a number of sensing electrodes 14, 20.

Eighth Apparatus

Figure 23:
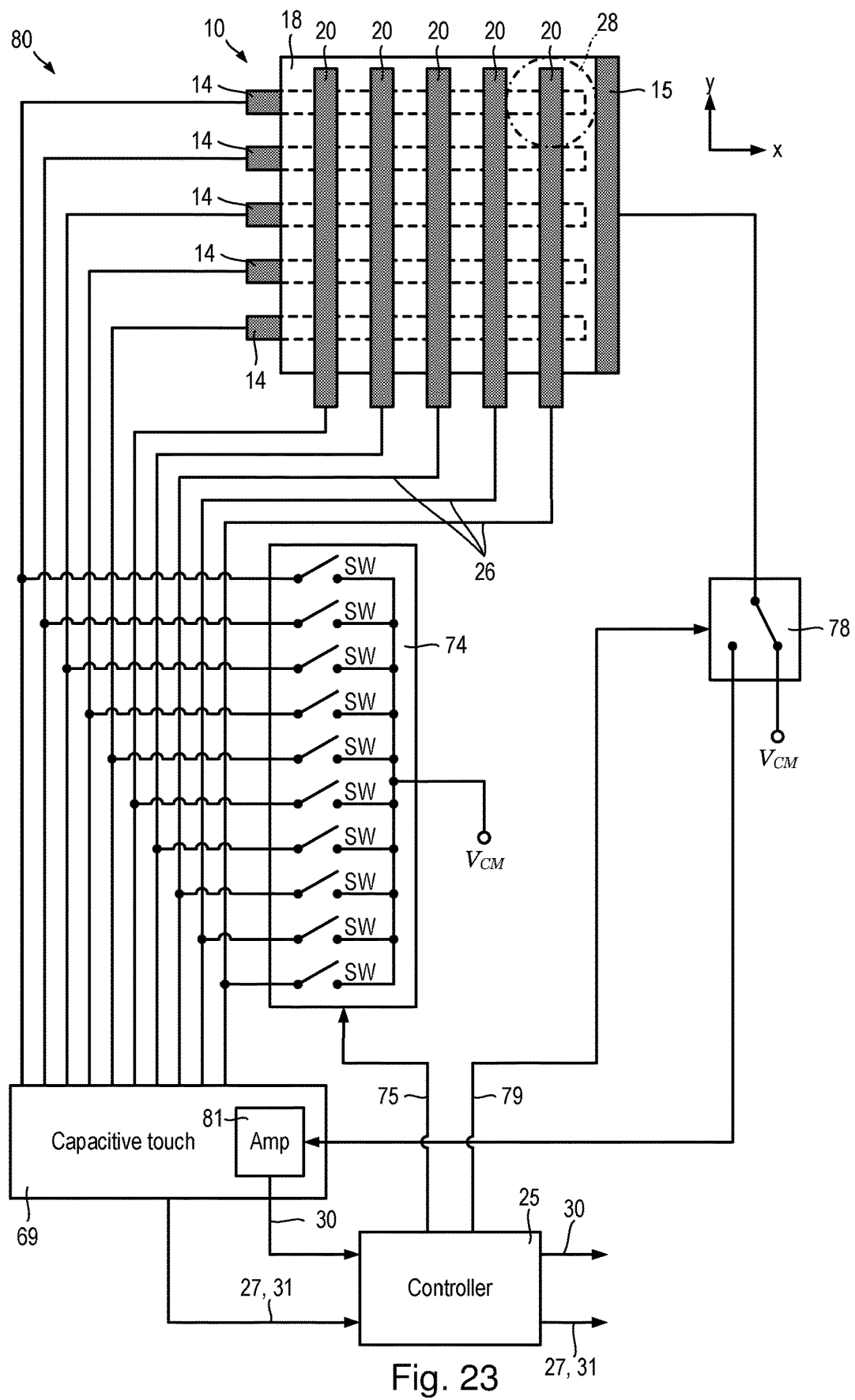
FIG. 23 illustrates an eighth apparatus for piezoelectric pressure measurements.

Referring also to FIG. 23, an eighth apparatus 80 for combined pressure and capacitance sensing is shown.

The eighth apparatus 80 is the same as the seventh apparatus 7, except that the common electrode charge amplifier 44 is not included in the measurement circuit, and the sensing electrodes 14, 20 are directly coupled to the terminals of the capacitive touch controller 69. Instead of common electrode charge amplifier 44, an internal charge amplifier 81 of the capacitive touch controller 69 is connectable to the common electrode 15 via the common electrode switch 78. In the seventh apparatus 80 the capacitive touch controller 69 is of a charge transfer type, which operates to measure capacitances based on monitoring the charges which flow onto/off from the monitored electrodes. Capacitive touch controllers 69 of a charge transfer type include a number of internal charge amplifiers 81 typically used for measuring capacitance values 27. In the eighth apparatus 80, one such internal charge amplifier 81 is used to monitor piezoelectric charges $Q_{CE}$ from the common electrode 15. The operation of the eighth apparatus 80 is the same as that of the seventh apparatus 7, and the internal charge amplifier 81 provides analogous functionality to the common electrode charge amplifier 44.

In this way, the eighth apparatus 80 may enable augmenting a conventional capacitive touch panel in a particularly simple way, as an unused monitoring channel of a conventional capacitive touch controller 69 may be used to provide the pressure measurement.

In a modification of the eighth apparatus 80, the sensing electrodes 14, 20 may be capacitively coupled to the terminals of the capacitive touch controller 69 using input capacitances $C_{in}$, in the same way as the seventh apparatus 77.

In another modification of the eighth apparatus 80, the sensing electrodes 14, 20 may be coupled to the terminals of the capacitive touch controller 69 using an array of switches (not shown) or a second switch network (not shown) which may be used to disconnect the sensing electrodes 14, 20 from the capacitive touch controller 69 during the pressure measurement period.

Although illustrated with reference to the first touch panel 10, the eighth apparatus 80 may alternatively use the second touch panel 53, the third touch panel 58, or any other suitable touch panel which includes a piezoelectric layer 16 arranged between one or more common electrodes 15 and a number of sensing electrodes 14, 20.

Ninth Apparatus

Figure 24:
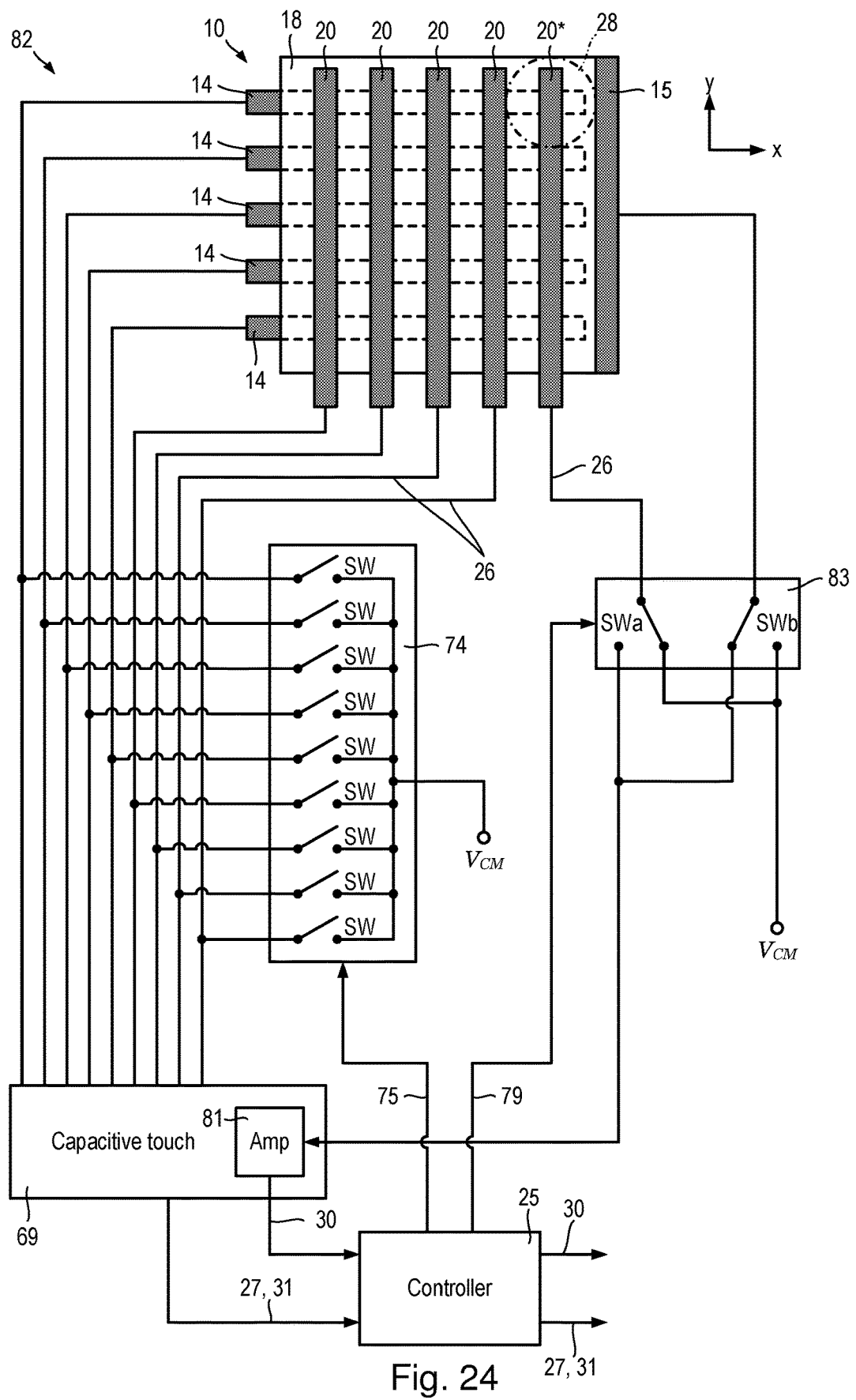
FIG. 24 illustrates a ninth apparatus for piezoelectric pressure measurements.

Referring also to FIG. 24, a ninth apparatus 82 for combined pressure and capacitance sensing is shown.

The ninth apparatus 82 is the same as the eighth apparatus 80, except that the measurement circuit is configured so that an internal charge amplifier 81 of the capacitive touch controller 69 is shared between the common electrode 15 and one of the second sensing electrodes 20*. The measurement circuit of the ninth apparatus 82 includes a third switch network 83 which includes a pair of switches SWa, SWb. One switch SWa connects one of the second sensing electrodes 20* to either the internal charge amplifier 81 or to system ground or common mode voltage $V_{CM}$. The second switch SWb connects the common electrode 15 to either the internal charge amplifier 81 or to system ground or common mode voltage $V_{CM}$.

During the first, capacitance measurement period, control signals 79 cause the switch SWa to connect the second sensing electrode 20* to the internal charge amplifier 81 and the capacitive touch controller 69 measures the capacitance values 27. The control signals 79 cause the switch SWb to connect the common electrode 15 to system ground or common mode voltage $V_{CM}$. The controller 25 may determine touch location data 31 based on the received capacitance values 27. Alternatively, the capacitive touch controller 69 may determine and output the touch location data 31.

During the second, pressure measurement period, the control signals 79 cause the switch SWa to connect the second sensing electrode 20* to system ground or common mode voltage $V_{CM}$, whilst switch SWb connects the common electrode 15 to the internal charge amplifier 81. During the pressure measurement period, the rest of the sensing electrodes 14, 20 are also connected to system ground or common mode voltage $V_{CM}$ by the switches SW of the switch network 74.

In this way, a conventional capacitive touch panel may be augmented with pressure measurement without the need to increase the number of channels of the capacitive touch controller 69.

Although the example of the ninth apparatus 82 includes a single, co-extensive common electrode 15, the touch panel 10 may include two or more common electrodes. For each additional common electrode, an additional pair of switches SWa, SWb are added to the third switch network 83. In some examples, each sensing electrode 14, 20 may share an internal charge amplifier 81 with a corresponding common electrode 15 which underlies and is co-extensive with that sensing electrode 14, 20.

In a modification of the ninth apparatus 82, the sensing electrodes 14, 20 other than the second sensing electrode 20* may be capacitively coupled to the terminals of the capacitive touch controller 69 using input capacitances in the same way as the seventh apparatus 77.

In another modification of the ninth apparatus 82, the sensing electrodes 14, 20 other than the second sensing electrode 20* may be coupled to the terminals of the capacitive touch controller 69 using an array of switches (not shown) or a second switch network (not shown) which may be used to disconnect the sensing electrodes 14, 20 other than the second sensing electrode 20* from the capacitive touch controller 69 during the pressure measurement period.

Although illustrated in relation to one second sensing electrode 20*, the common electrode 15 may share an internal charge amplifier 81 with any one of the first or second sensing electrodes 14, 20.

Although illustrated with reference to the first touch panel 10, the ninth apparatus 82 may alternatively use the second touch panel 53, the third touch panel 58, or any other suitable touch panel which includes a piezoelectric layer 16 arranged between one or more common electrodes 15 and a number of sensing electrodes 14, 20.

Tenth Apparatus

Figure 25:
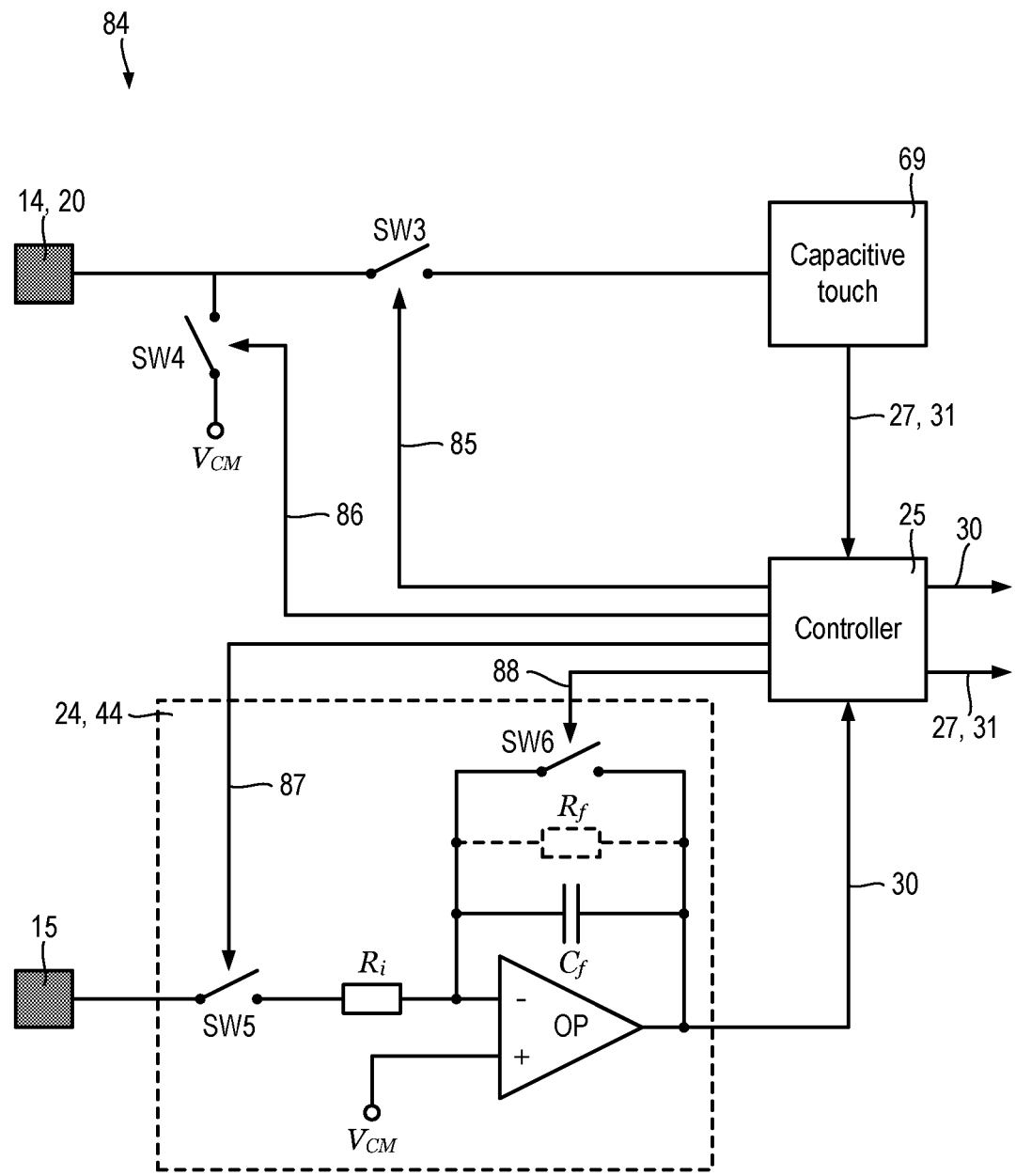
FIG. 25 illustrates a tenth apparatus for piezoelectric pressure measurements.

Referring also to FIG. 25, a tenth apparatus 84 for combined pressure and capacitance sensing is shown.

The tenth apparatus 84 includes the first touch panel to and a measurement circuit including the controller 25, the capacitive touch controller 69 and a common electrode charge amplifier 44. Each sensing electrode 14, 20 is coupled to a terminal of the capacitive touch controller 69 by a corresponding switch SW3, and also to system ground or a common mode voltage $V_{CM}$ by a switch SW4. Although only one sensing electrode 14, 20 is shown in FIG. 25 for simplicity, the configuration of each sensing electrode 14, 20 is the same.

The common electrode charge amplifier 44 includes an operational amplifier OP configured as an integrator with a feedback capacitance $C_f$ connected between the output and the inverting input. A switch SW6 is connected in parallel with the feedback capacitance $C_f$. Optionally, a feedback resistance $R_f$ may also be connected in parallel with feedback capacitance $C_f$ and switch SW6. The inverting input of the operational amplifier OP is coupled to the common electrode 15 via a switch SW5 and an input resistance R connected in series. The non-inverting input of the operational amplifier OP is connected to system ground or common mode voltage $V_{CM}$. The output of the operational amplifier OP provides the second piezoelectric signal 30 to the controller 25. The operational amplifier OP may include other connections such as power supplies and so forth, which are not illustrated in FIG. 25 for simplicity.

The switches SW3, SW4, SW5, SW6 are controlled to be open (non-conductive) or closed (conductive) by corresponding control signals 85, 86, 87, 88 provided by the controller 25.

Figure 26:
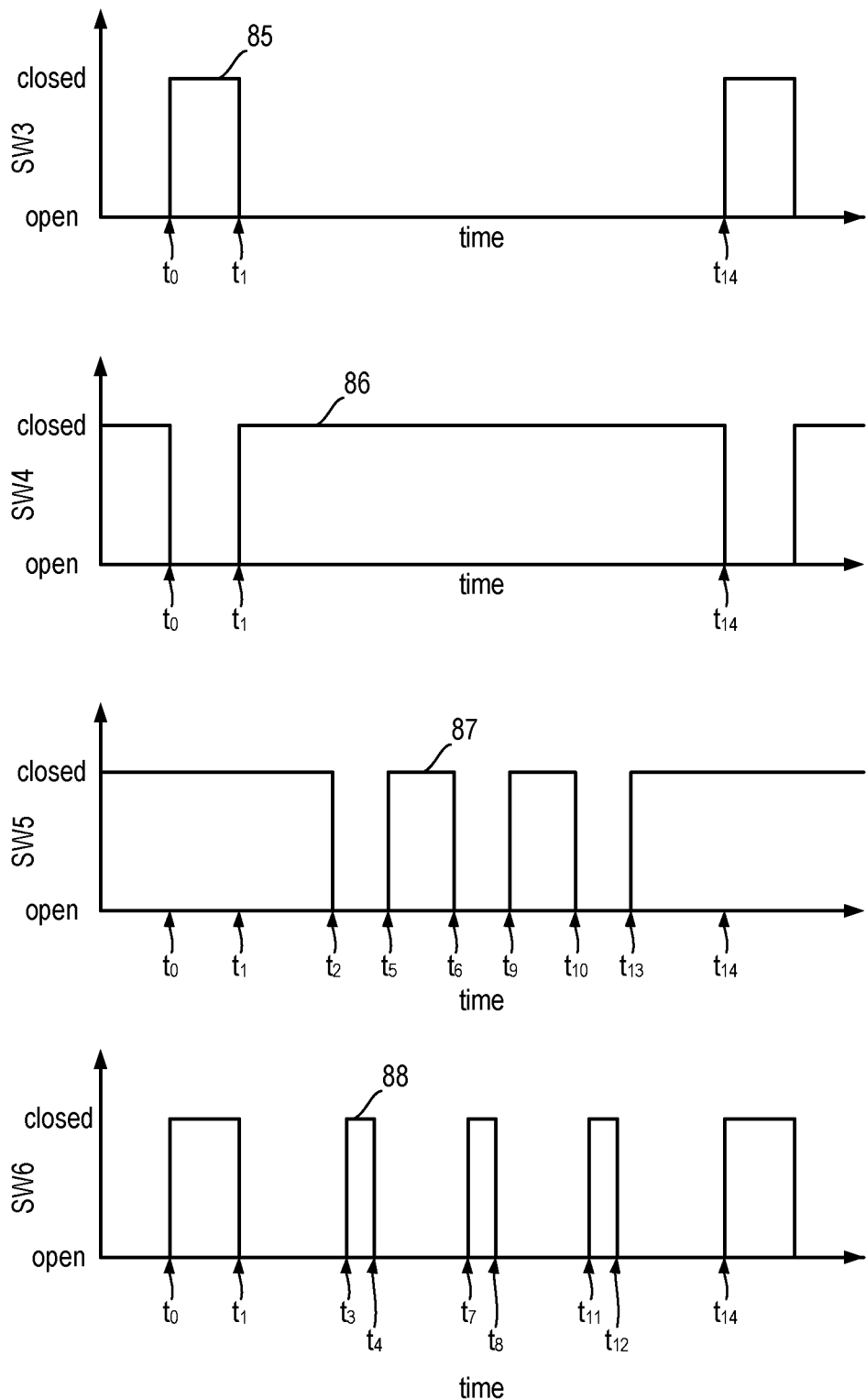
FIG. 26 illustrates switch timings for the tenth apparatus.

Referring also to FIG. 26, timings for the switches SW3, SW4, SW5, SW6 are shown.

During a first, capacitance measurement period between time $t_0$ and $t_1$, (denoted $[t_0, t_1]$ for brevity), the switch SW3 is closed (conductive) and the switch SW4 is open (non-conductive), so that each sensing electrode 14, 20 is connected to a corresponding terminal of the capacitive touch controller 69. During the first period $[t_0, t_1]$ the switches SW5 and SW6 are closed. The closure of switch SW5 sets the common electrode 15 to system ground or common mode voltage $V_{CM}$, which may act to shield the sensing electrodes 14, 20 from noise induced by a display (not shown) underlying the touch panel to. The closure of switch SW6 prevents the feedback network of the operational amplifier OP from accumulating charges induced by the measurement of the capacitance values 27. The capacitive touch controller 69 measures the capacitance values 27, using any known suitable capacitance measurement technique.

During a second, pressure measurement period $[t_1, t_{14}]$, the switch SW3 is open and the switch SW4 is closed, so that the sensing electrodes 14, 20 are disconnected from the capacitive touch controller 69, and instead are connected to system ground or common mode voltage $V_{CM}$. In this way, the sensing electrodes 14, 20 may act to electrostatically shield the common electrode 15 from coupling to external electric fields.

The switch SW6 is generally open during the second period [$t_1$, $t_{14}$] in order to allow accumulation of charges induced on the common electrode 15. However, in order to avoid drifting of a DC offset on the operational amplifier OP, the switch SW6 may be closed during one or more short reset periods in order to discharge the feedback capacitance $C_f$.

For example, as illustrated in FIG. 26 the switch SW6 may be closed for three reset periods [$t_3$, $t_4$], [$t_7$, $t_8$] and [$t_{11}$, $t_{12}$] during the second period [$t_1$, $t_{14}$]. Generally the switch SW5 is closed throughout the second period [$t_1$, $t_{14}$] in order to permit charges induced on the common electrode 15 to be detected by operational amplifier OP. However, the switch SW5 is preferably opened for a period [$t_2$, $t_5$], [$t_6$, $t_9$]; [$t_{10}$, $t_{13}$] extending before and after each reset period [$t_3$, $t_4$], [$t_7$, $t_8$], [$t_{11}$, $t_{12}$], in order to avoid discharging piezoelectric charges $Q_{CE}$ during the reset periods [$t_3$, $t_4$], [$t_7$, $t_8$], [$t_{11}$, $t_{12}$]. The second piezoelectric signal 30 output by the operational amplifier OP is received by the controller 25. The second piezoelectric signal 30 may be accumulated in the digital domain by the controller 25, for example, by integration or summation.

When the switch SW5 is closed during the first period [$t_0$, $t_1$], the common electrode 15 is connected to system ground or common mode voltage $V_{CM}$, electrostatically shielding the sensing electrodes 14, 20 from display noise. This may enable the first period [$t_0$, $t_1$] to correspond to a display period of an underlying display (not shown), whilst the second period [$t_1$, $t_{14}$] may correspond to a display blanking period. In this way, the display blanking period need not be divided between capacitance and pressure measurements, allowing more time for each.

Figure 27:
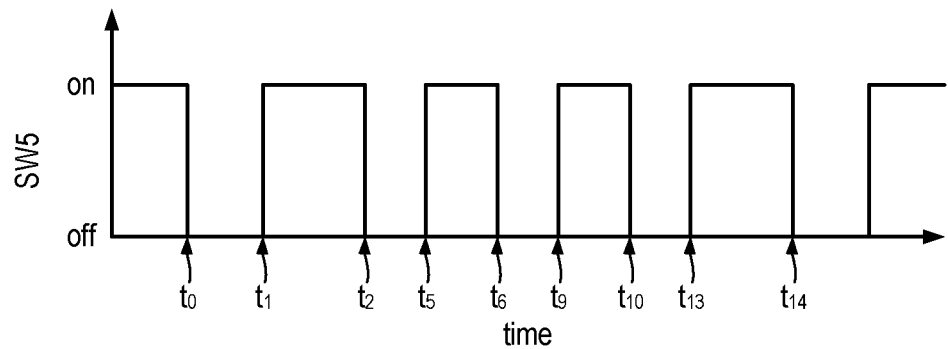
FIG. 27 illustrates alternative switch timing for the tenth apparatus.

Referring also to FIG. 27, the switch SW5 need not be closed during the first time period [$t_0$, $t_1$], and in some examples may be held open during the first time period [$t_0$, $t_1$]. Leaving the common electrode 15 floating may not provide shielding from display noise. However, the background level of capacitance of the sensing electrodes 14, 20 will be reduced. This may improve the sensitivity for measurements of the capacitance values 27 by the capacitive touch controller 69.

Figure 28:
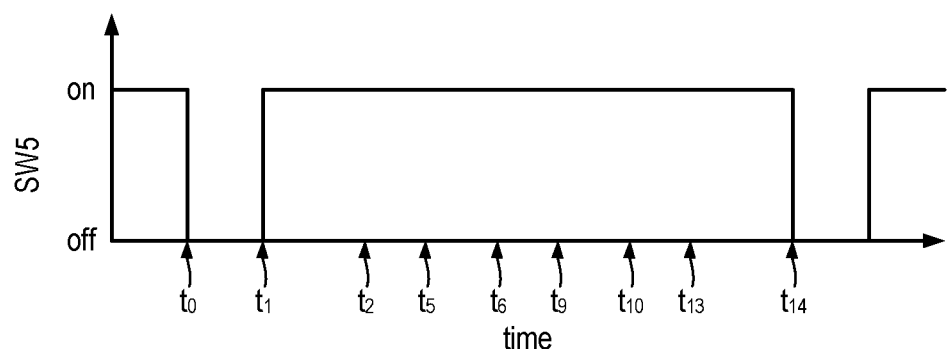
FIG. 28 illustrates alternative switch timing for the tenth apparatus.

Referring also to FIG. 28, the switch SW5 does not need to be opened during any the reset periods [$t_3$, $t_4$], [$t_7$, $t_8$], [$t_{11}$, $t_{12}$], and in some examples may be left closed.

In other examples, the switch SW5 may be closed at all times, or even omitted entirely.

Although described with reference to the first touch panel 10, the tenth apparatus 84 may alternatively use the second touch panel 53, the third touch panel 58, or any other suitable touch panel which includes a piezoelectric layer 16 arranged between one or more common electrodes 15 and a number of sensing electrodes 14, 20.

Although the examples described hereinbefore have been primarily described with reference to combined piezoelectric and capacitive touch panels and apparatus, it should be appreciated that the first and second methods of the specification may also be used in a touch panel apparatus which does not measure capacitances and which only measures piezoelectric pressure signals. Provided that a piezoelectric touch panel allows determining the coordinates x, y of a user interaction, appropriate pre-calibrated values of the coefficients $k_n(x,y)$, $h_m(x,y)$, and/or $C_{CE}(x,y)$ may be retrieved and applied in Equations (13), (15), (16), or the voltage equivalents thereof.

Although in some examples described hereinbefore a first piezoelectric pressure signal 29 is generated corresponding to each first or second sensing electrode 14, 20, this need not be the case. In other examples, signals from a group of two or more adjacent sensing electrodes 14, 20 may be combined by a single charge amplifier 34, to produce a first piezoelectric pressure signal 29 corresponding to the charge induced on the group of two or more adjacent sensing electrodes 14, 20.

Although the examples described hereinbefore have been primarily described with reference to touch panels in which first and second sensing electrodes 14, 20 are elongated in perpendicular directions, this need not be the case. In other examples, the second sensing electrodes 20 may be omitted and the first sensing electrodes may take the form of a two dimensional array of discrete touch pads. In further examples, the second sensing electrodes 20 may be omitted and the first sensing electrodes 14 may take the form of discrete touch panels arranged in irregular arrays, disposed at arbitrary locations, or a arranged with a mixture of some first sensing electrodes 14 arranged in one or more regular arrays and other first sensing electrodes 14 disposed in one or more irregular arrays or at arbitrary locations. The first and second methods of the present specification may still be used with such examples.

Although claims have been formulated in this application to particular combinations of features, it should be understood that the scope of the disclosure of the present invention also includes any novel features or any novel combination of features disclosed herein either explicitly or implicitly or any generalization thereof, whether or not it relates to the same invention as presently claimed in any claim and whether or not it mitigates any or all of the same technical problems as does the present invention. The applicant hereby gives notice that new claims may be formulated to such features and/or combinations of such features during the prosecution of the present application or of any further application derived therefrom.

What is claimed is:

1. An apparatus for processing signals from a touch panel, the touch panel comprising a layer of piezoelectric material disposed between a plurality of sensing electrodes and at least one common electrode, the apparatus comprising:
   a capacitive touch controller for connections to the plurality of sensing electrodes;
   a switch network comprising a plurality of inputs for connection to some or all of the plurality of sensing electrodes, and an output connected to a given voltage;
   a circuit for connection to the at least one common electrode and configured to generate, based on signals received from the at least one common electrode, a pressure signal indicative of a total pressure applied to the touch panel;
   an apparatus controller configured to:
   control the switch network to couple any connected sensing electrodes to the given voltage during a pressure measurement period;
   determine an estimate of the total pressure based on the pressure signal during the pressure measurement period.

2. The apparatus according to claim 1, wherein the circuit is an internal charge amplifier of the capacitive touch controller.

3. The apparatus according to claim 2, wherein the switch network comprises a first switch network and the apparatus further comprises a second switch network configured to connect the internal charge amplifier to a sensing electrode of the plurality of sensing electrodes during a capacitance measurement period, and to connect the internal charge amplifier to the at least one common electrode during the pressure measurement period.

4. The apparatus according to claim 3, wherein the second switch network is further configured to connect the at least one common electrode to the given voltage during the capacitance measurement period, and to connect the sensing electrode to the given voltage during the pressure measurement period.

5. The apparatus according to claim 1, further comprising a common electrode switch configured to connect the at least one common electrode to the given voltage during a capacitance measurement period, and to connect the at least one common electrode to the circuit during the pressure measurement period.

6. The apparatus according to claim 1, wherein the circuit comprises a second circuit, the pressure signal comprises a second pressure signal, and the the switch network is configured for connection to a subset of the plurality of sensing electrodes, the apparatus further comprising:
a first circuit for connection to sensing electrodes of the plurality of sensing electrodes not included in the subset, the first circuit configured to generate a first pressure signal indicative of a pressure acting on the touch panel proximate to the connected sensing electrodes not included in the subset:
wherein the apparatus controller is configured to determine the estimate of the total pressure based on a weighted difference of the second pressure signal and the first pressure signal.

7. The apparatus according to claim 1, wherein the capacitive touch controller is configured for connection to each sensing electrode of the plurality of sensing electrodes via a corresponding first switch;
wherein each input of the plurality of inputs of the switch network is connected to the given voltage by a corresponding second switch;
wherein the circuit comprises a common electrode charge amplifier configured to generate the pressure signal;
wherein the apparatus controller is configured to control the first and second switches to:
close the first switches and open the second switches during a capacitance measurement period;
open the first switches and close the second switches during the pressure measurement period.

8. The apparatus according to claim 1, wherein the capacitive touch controller is configured to generate, for each sensing electrode of the plurality of sensing electrodes, a capacitance signal indicative of a capacitance of the sensing electrode;
wherein the apparatus controller or the capacitive touch controller is configured to determine a location at which pressure is applied to the touch panel based on the capacitance signals.

9. The apparatus according to claim 1, wherein the given voltage is system ground.

10. The apparatus according to claim 1, wherein the given voltage is a common mode voltage.

11. A method of processing signals from a touch panel, the touch panel comprising a layer of piezoelectric material disposed between a plurality of sensing electrodes and at least one common electrode, wherein the plurality of sensing electrodes are connected to a capacitive touch controller and the at least one common electrode is connected to a circuit, the method comprising:
coupling, using a switch network, some or all of the plurality of sensing electrodes to a given voltage during a pressure measurement period;
generating, using the circuit, a pressure signal indicative of a total pressure applied to the touch panel, the pressure signal based on signals received from the at least one common electrode;
determining, using an apparatus controller, an estimate of the total pressure based on the pressure signal during the pressure measurement period.

12. The method according to claim 11, wherein the circuit is an internal charge amplifier of the capacitive touch controller.

13. The method according to claim 12, wherein the switch network comprises a first switch network, the method further comprising:
connecting, using a second switch network, the internal charge amplifier to a sensing electrode of the plurality of sensing electrodes during a capacitance measurement period;
connecting, using the second switch network, the internal charge amplifier to the at least one common electrode during the pressure measurement period.

14. The method according to claim 13, further comprising:
connecting, using the second switch network, the at least one common electrode to the given voltage during the capacitance measurement period;
connecting, using the second switch network, the sensing electrode to the given voltage during the pressure measurement period.

15. The method according to claim 11, further comprising:
connecting, using a common electrode switch, the at least one common electrode to the given voltage during a capacitance measurement period;
connecting, using the common electrode switch, the at least one common electrode to the circuit during the pressure measurement period.

16. The method according to claim 11, wherein the circuit comprises a second circuit, the pressure signal comprises a second pressure signal, and the switch network is connected to a subset of the plurality of sensing electrodes, the method further comprising:
generating, using a first circuit connected to sensing electrodes of the plurality of sensing electrodes not included in the subset, a first pressure signal indicative of a pressure acting on the touch panel proximate to the connected sensing electrodes not included in the subset;
wherein determining the estimate of the total pressure comprises determining the estimate of the total pressure based on a weighted difference of the second pressure signal and the first pressure signal.

17. The method according to claim 11, wherein each sensing electrode of the plurality of sensing electrodes is connected to the capacitive touch controller by a corresponding first switch, wherein the switch network comprises a plurality of second switches, each second switch of the plurality of second switches connecting a sensing electrode of the plurality of sensing electrodes to the given voltage, and wherein the circuit comprises a common electrode charge amplifier configured to generate the pressure signal, the method further comprising:

using the apparatus controller to control the first and second switches to:

close the first switches and open the second switches during a capacitance measurement period;

open the first switches and close the second switches during the pressure measurement period.

18. The method according to claim 11, further comprising:

generating for each sensing electrode of the plurality of sensing electrodes, using the capacitive touch controller, a capacitance signal indicative of a capacitance of the sensing electrode;

determining, using the apparatus controller or the capacitive touch controller, a location at which pressure is applied to the touch panel based on the capacitance signals.

19. The method according to claim 11, wherein the given voltage is system ground.

20. The method according to claim 11, wherein the given voltage is a common mode voltage.

* * * * *